(12) United States Patent
Ota et al.

(10) Patent No.: US 8,587,847 B2
(45) Date of Patent: Nov. 19, 2013

(54) IMAGE FORMING DEVICE

(75) Inventors: Yoshihide Ota, Kanagawa (JP); Wataru Hojo, Tokyo (JP); Hideyuki Takemoto, Kanagawa (JP); Makoto Yoshioka, Saitama (JP)

(73) Assignee: Ricoh Company, Ltd., Tokyo (JP)

( * ) Notice: Subject to any disclaimer, the term of this patent is extended or adjusted under 35 U.S.C. 154(b) by 111 days.

(21) Appl. No.: 13/330,007

(22) Filed: Dec. 19, 2011

(65) Prior Publication Data

US 2012/0162728 A1 Jun. 28, 2012

(30) Foreign Application Priority Data

Dec. 24, 2010 (JP) ................................. 2010-287893
Feb. 16, 2011 (JP) ................................. 2011-030625
Mar. 28, 2011 (JP) ................................. 2011-071099

(51) Int. Cl.
*H04N 1/04* (2006.01)
(52) U.S. Cl.
USPC ............ 358/498; 358/497; 358/474; 358/496
(58) Field of Classification Search
USPC .................................. 358/498, 497, 474, 496
See application file for complete search history.

(56) References Cited

U.S. PATENT DOCUMENTS

| | | | |
|---|---|---|---|
| 6,185,010 B1 | 2/2001 | Watanabe | |
| 6,466,753 B2 | 10/2002 | Kida | |
| 7,298,979 B2 | 11/2007 | Kitozaki | |
| 7,751,751 B2 | 7/2010 | Ohta et al. | |
| 7,873,303 B2 | 1/2011 | Ohta et al. | |
| 7,878,725 B2 | 2/2011 | Ohkubo et al. | |
| 7,937,028 B2 | 5/2011 | Ogawa et al. | |
| 7,963,524 B2 | 6/2011 | Ohta | |
| 7,982,923 B2 | 7/2011 | Andoh et al. | |
| 8,194,255 B2 * | 6/2012 | Andoh et al. | .................. 358/1.1 |
| 2007/0279888 A1 | 12/2007 | Nanno et al. | |
| 2007/0285701 A1 | 12/2007 | Ohta et al. | |
| 2008/0180762 A1 * | 7/2008 | Andoh et al. | .................. 358/498 |
| 2008/0181695 A1 | 7/2008 | Andoh et al. | |
| 2008/0181698 A1 | 7/2008 | Andoh et al. | |
| 2008/0291501 A1 | 11/2008 | Shiraki et al. | |
| 2008/0317498 A1 | 12/2008 | Andoh et al. | |
| 2009/0074495 A1 | 3/2009 | Shiraki et al. | |
| 2009/0122330 A1 | 5/2009 | Andoh et al. | |
| 2009/0162082 A1 | 6/2009 | Shiraki et al. | |
| 2009/0218472 A1 | 9/2009 | Takemoto | |

FOREIGN PATENT DOCUMENTS

| | | |
|---|---|---|
| JP | 09-015923 | 1/1997 |
| JP | 2846435 | 1/1999 |
| JP | 2001-237576 | 8/2001 |
| JP | 2003-283727 | 10/2003 |
| JP | 2006-047717 | 2/2006 |
| JP | 2007-246281 | 9/2007 |
| JP | 3981230 | 9/2007 |
| JP | 2009-206965 | 9/2009 |
| JP | 2010-256570 | 11/2010 |

* cited by examiner

*Primary Examiner* — Houshang Safaipour
(74) *Attorney, Agent, or Firm* — IPUSA, PLLC

(57) ABSTRACT

An image forming device includes an image forming unit, an image reading unit arranged above an upper part of the image forming unit, a sheet ejection space between the image forming unit and the image reading unit, and a supporting unit arranged on the upper part of the image forming unit to surround at least two sides of the sheet ejection space in different directions. The image reading unit is secured to the upper part of the image forming unit through the supporting unit.

19 Claims, 32 Drawing Sheets

IMAGE FORMING DEVICE

BACKGROUND OF THE INVENTION

1. Field of the Invention

The present disclosure generally relates to an image forming device, and more particularly to an image forming device including a sheet ejection space between an image formation unit and an image reading unit.

2. Description of the Related Art

An image forming device is arranged to include an image reading unit to read image information from a document, an image forming unit to form an image of the read image information on a copy sheet, a sheet feeding part to supply the copy sheet, and a sheet ejection part to eject the copy sheet on which the image is formed out of the image forming device.

From among the image forming devices of the above type, some image forming devices have been proposed for improvements of compactness and space saving. For example, refer to Japanese Patent No. 3981230, Japanese Laid-Open Patent Publication No. 09-015923, and Japanese Patent No. 2846435. In such an improved image forming device, the sheet feeding part is accommodated in a lower portion of the image forming unit, the image reading unit is disposed above an upper portion of the image forming unit, and a sheet ejection space is provided between the image forming unit and the image reading unit.

In the above-described image forming device according to the related art, the image reading unit is disposed in and supported by a mounting portion. The mounting portion is formed by several component parts in combination, including an arm extending from a supporting portion arranged in the rear part of the image forming unit to the front part of the image forming unit. It is difficult to ensure that the surface of the mounting portion (upon which the image reading unit is mounted) is mounted with good plane accuracy. The mounted position of the image reading unit is easily distorted from the horizontal position. As a result, the accuracy of the image reading by the image reading unit will be affected and the quality of the image transferred to the copy sheet will be deteriorated.

Further, it is demanded that the direction of an operation unit arranged in the image forming device can be adjusted to an arbitrary rotation angle and the rotated position of the operation unit after the adjustment can be held stably.

SUMMARY OF THE INVENTION

In one aspect, the present disclosure provides an image forming device arranged with a supporting unit formed to surround at least two sides of a sheet ejection space in different directions, so that the supporting unit stably supports an image reading unit above an image forming unit.

In an embodiment which solves or reduces one or more of the above-mentioned problems, the present disclosure provides an image forming device including: an image forming unit; an image reading unit arranged above an upper part of the image forming unit; a sheet ejection space between the image forming unit and the image reading unit; and a supporting unit arranged on the upper part of the image forming unit to surround at least two sides of the sheet ejection space in different directions, wherein the image reading unit is secured to the upper part of the image forming unit through the supporting unit.

Other objects, features and advantages of the present disclosure will become more apparent from the following detailed description when read in conjunction with the accompanying drawings.

DETAILED DESCRIPTION OF THE PREFERRED EMBODIMENTS

A description will be given of embodiments of the present disclosure with reference to the accompanying drawings.

Figure 1:
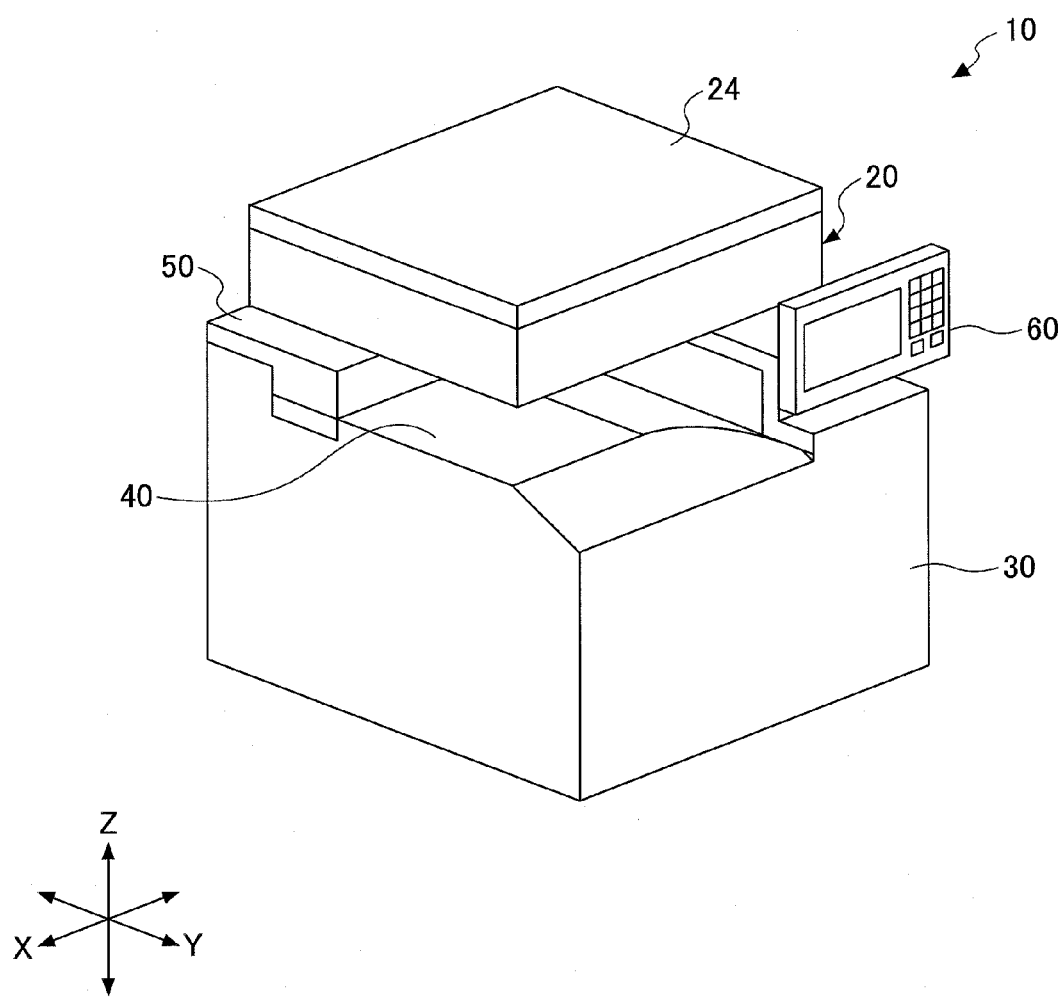
FIG. 1 is a perspective view of an image forming device of an embodiment of the present disclosure when viewed from a slanting left position.
Figure 2:
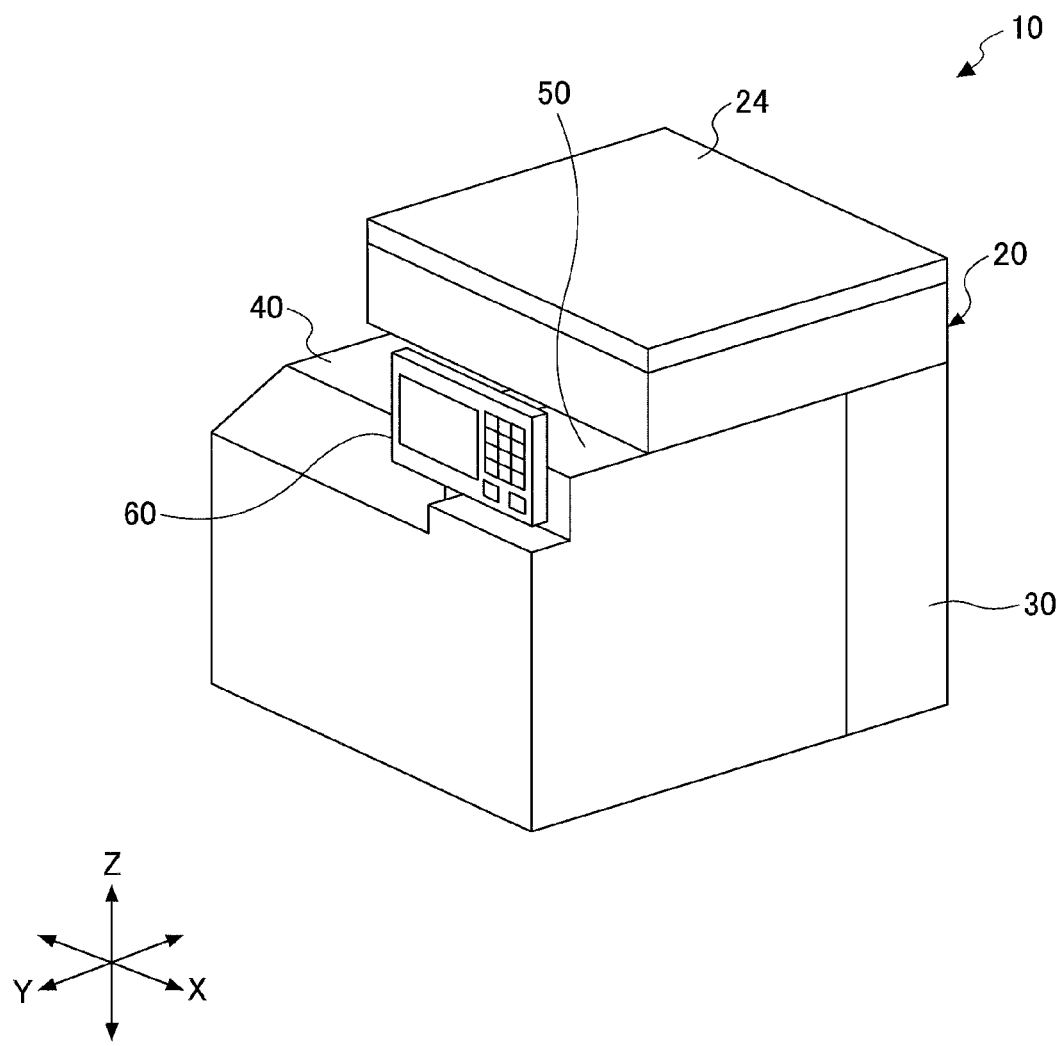
FIG. 2 is a perspective view of the image forming device of the present embodiment when viewed from a slanting right position.

FIG. 1 is a perspective view of an image forming device of an embodiment of the present disclosure when viewed from a slanting left position. FIG. 2 is a perspective view of the image forming device of the present embodiment when viewed from a slanting right position. The outline structure of the whole image forming device is illustrated in FIGS. 1 and 2 and a detailed structure of respective component parts which constitutes the image forming device will be described later.

As shown in FIGS. 1 and 2, the image forming device 10 of the present embodiment includes an image reading unit 20, an image forming unit 30, a sheet ejection space 40, and a supporting unit 50. The image reading unit 20 includes a scanner part which reads image information from a document, and a top surface of the scanner part is opened and closed by a lid 24. The image forming unit 30 transfers toner corresponding to the read image information to a copy sheet and fixes the toner image to the copy sheet.

The sheet ejection space 40 is a space where the copy sheet with the image information formed therein is ejected. The sheet ejection space 40 is provided between the image reading unit 20 and the image forming unit 30. The supporting unit 50 is disposed on an upper part of the image forming unit 30, and the top surface of the supporting unit 50 is fixed to a lower part of the image reading unit 20. The supporting unit 50 is covered by the housing (cover member) of the image forming unit 30, and the presence of the supporting unit 50 is not visible from the outside.

The image reading unit 20 is constructed so that the width dimension thereof in the right/left direction (the direction of X) and the depth dimension thereof in the front/rear direction (the direction of Y) are smaller than those of the upper part of the image forming unit 30 respectively. The mounting location of the image reading unit 20 is shifted rearward and rightward. Namely, the image reading unit 20 is disposed so that the rear end face and the right-hand side face of the image reading unit 20 are flush with the rear end face and the right-hand side face of the image forming unit 30 respectively.

Hence, a step portion is formed between the left-hand side face of the image reading unit 20 and the top surface of the image forming unit 30 and a step portion is formed between the front end surface of the image reading unit 20 and the top surface of the image forming unit 30. By the presence of the step portions, the copy sheet ejected to the sheet ejection space 40 is easily recognizable. This allows the operator to easily recognize the copy sheet ejected to the sheet ejection space 40 and take out the copy sheet from the sheet ejection space 40.

An operation unit 60 is attached to a front portion of the upper part of the image forming unit 30. For example, the operation unit 60 is constructed to include switches, such as a power switch, and a touch-panel liquid crystal panel.

Figure 3:
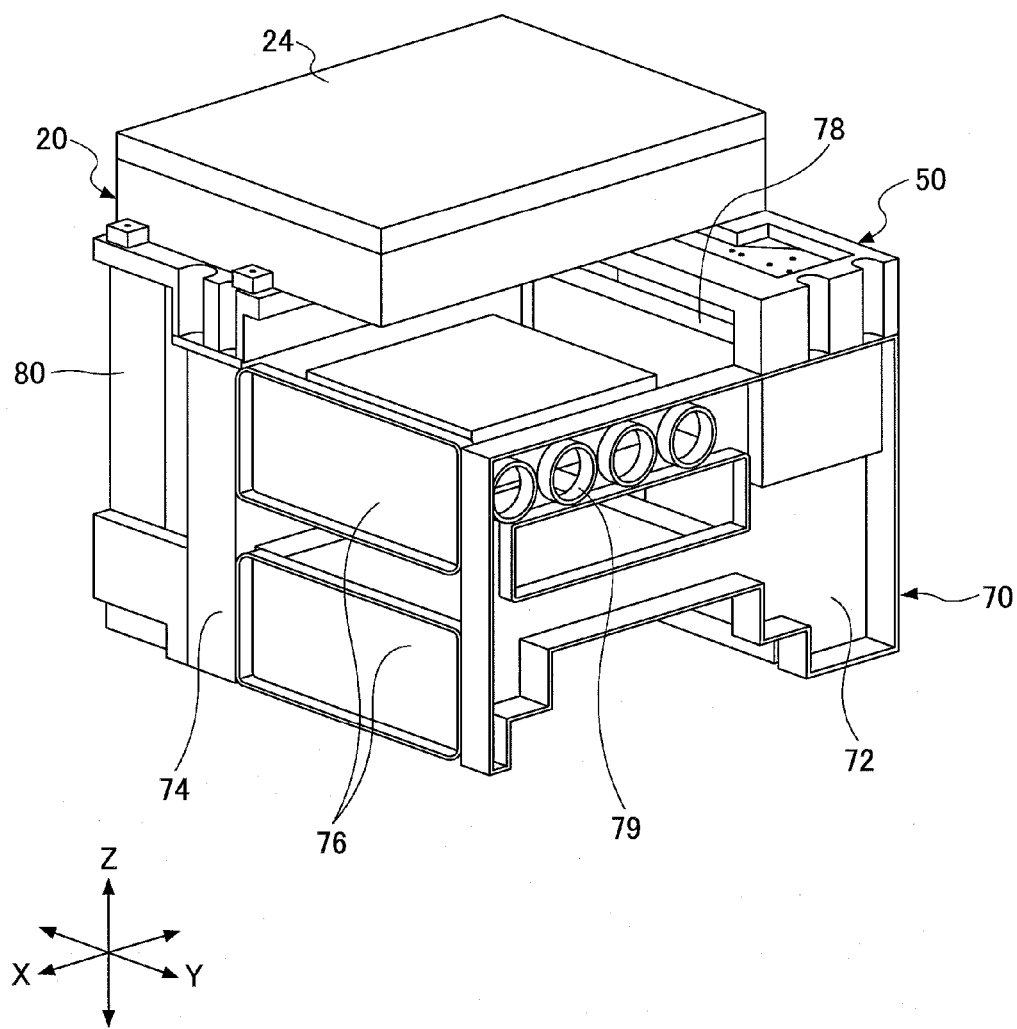
FIG. 3 is a perspective view showing the internal structure of an image forming unit on which an image reading unit is mounted.
Figure 4:
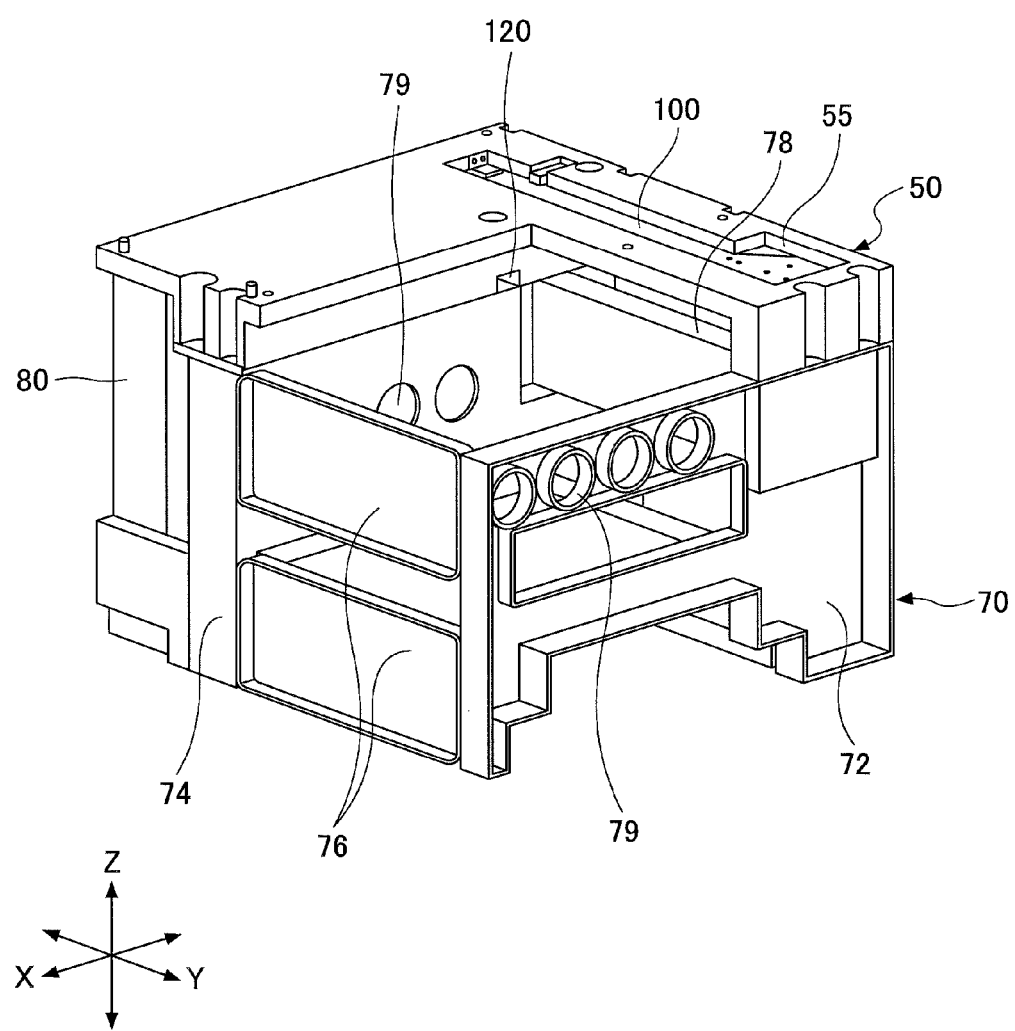
FIG. 4 is a perspective view showing the internal structure of the image forming unit from which the image reading unit is removed.

FIG. 3 is a perspective view showing the internal structure of the image forming unit 30 on which the image reading unit 20 is mounted. FIG. 4 is a perspective view showing the internal structure of the image forming unit 30 from which the image reading unit 20 is removed. In FIGS. 3 and 4, the housing of the image forming unit 30 is removed and the internal structure of the image forming unit 30 is exposed.

As shown in FIGS. 3 and 4, the image reading unit 20 is disposed on the upper part of the supporting unit 50 and fixed thereto. The supporting unit 50 is formed to have a generally L-shaped configuration when viewed from an upper position. The supporting unit 50 is formed to surround at least two sides of the sheet ejection space 40 in different directions (which are, in this embodiment, the right-hand side and the rear-end side). The image reading unit 20 is constructed so that the width dimension thereof in the direction of X and the depth dimension thereof in the direction of Y are respectively smaller than those of the upper part of the image forming unit 30, and the mounting location of the image reading unit 20 is shifted rearward and rightward. Hence, the image reading unit 20 is stably supported by the supporting unit 50.

The supporting unit 50 supports the image reading unit 20 in a horizontal condition, and the respective side faces of the supporting unit 50 in the directions of X and Y define the boundary lines to the right-hand side and the rear-end side of the sheet ejection space 40. Alternatively, the supporting unit 50 may be formed in a fork-shaped configuration (or in the shape of ⊐) to surround the left-hand side, the right-hand side, and the rear-end face of the sheet ejection space 40 in three different directions.

Further, the supporting unit 50 constitutes a part of a frame body 70 of the image forming unit 30. The frame body 70 includes a front vertical frame 72, a rear vertical frame 74, a left-hand side plate frame 76, and a right-hand side plate frame 78, in addition to the above-described supporting unit 50. The front vertical frame 72 and the rear vertical frame 74 support the load of the image reading unit 20 and the supporting unit 50. In the front vertical frame 72 and the rear vertical frame 74, a plurality of the mounting holes 79 are formed to hold respective component parts (such as toner containers) of the image forming unit 30.

An electric-wiring box 80 is attached to the rear-end face (rear side) of the rear vertical frame 74. A printed wiring board on which respective electronic parts of control circuits are fabricated is accommodated in the electric-wiring box 80.

Figure 5:
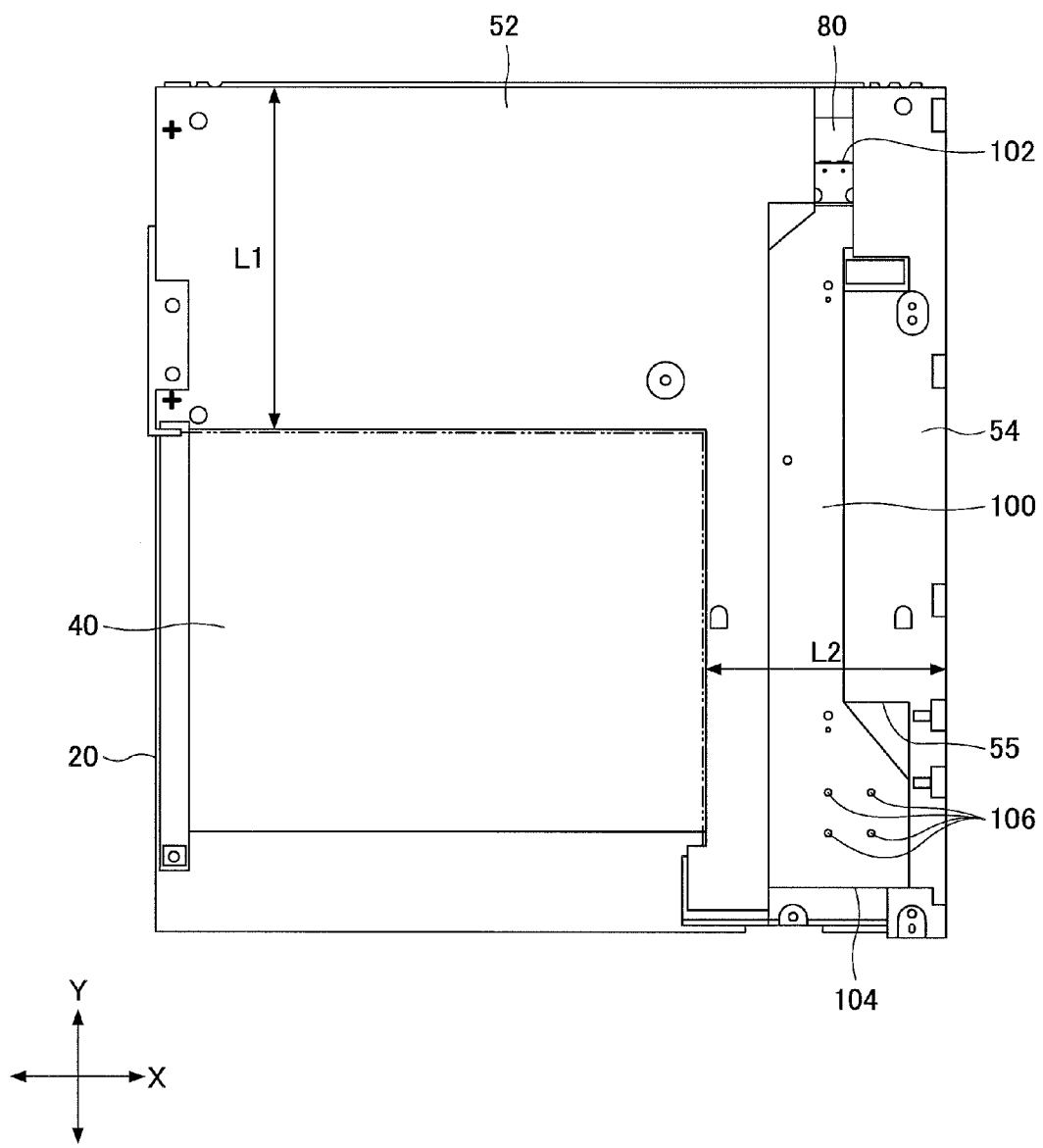
FIG. 5 is a plan view of a supporting unit.

FIG. 5 is a plan view of the supporting unit 50. As shown in FIG. 5, the supporting unit 50 is an integrally molded part which is formed of a resin material. The supporting unit 50 includes a first support portion 52 extending in the direction of X, and a second support portion 54 extending in the direction of Y which is perpendicular to the direction of the first support portion 52.

The first support portion 52 has a width L1 in the front/rear direction (the direction of Y) which is larger than a width L2 of the second support portion 54 in the right/left direction (the direction of X) (L1>L2). The first support portion 52 can stably support the load of the image reading unit 20 on the top surface thereof.

A recess 55 is formed in the top surface of the second support portion 54, and a reinforcing member 100 formed of a metallic material is embedded in the recess 55. The reinforcing member 100 includes a number of the metal stay parts which are formed along the lines in the direction of Y, and the metal stay parts are fixed to a number of screw holes formed in the recess 55 by using fastening parts, such as screws. Hence, the supporting unit 50 is reinforced by the reinforcing member 100 so as to prevent deformation of the supporting unit 50, such as distortion or twisting, and the rigidity is increased. The image reading unit 20 can be supported by the supporting unit 50 to maintain good plane accuracy of the image reading unit 20.

A connection portion 102 is formed at the rear end of the reinforcing member 100, and the connection portion 102 is provided to secure the electric-wiring box 80 by screws. By securing the electric-wiring box 80 to the connection portion 102 of the reinforcing member 100 by the screws, the ground terminal (GND) of the printed wiring board contained in the electric-wiring box 80 is electrically connected to the reinforcing member 100 of the metallic material.

A connection portion 104 is formed at the front end of the reinforcing member 100, and the connection portion 104 is connected to the operation unit 60. By securing the metal stay parts of the operation unit 60 to the connection portion 104 of the reinforcing member 100 by screws, the grounding terminal (GND) of the printed wiring board contained in the operation unit 60 is electrically connected to the reinforcing member 100 of the metallic material. Hence, the electrical connection between the operation unit 60 and the electric-wiring box 80 and the electrical connection between the image reading unit 20 and the electric-wiring box 80 are made by the reinforcing member 100, and the operation unit 60, the electric-wiring box 80, and the image reading unit 20 are grounded.

Figure 6:
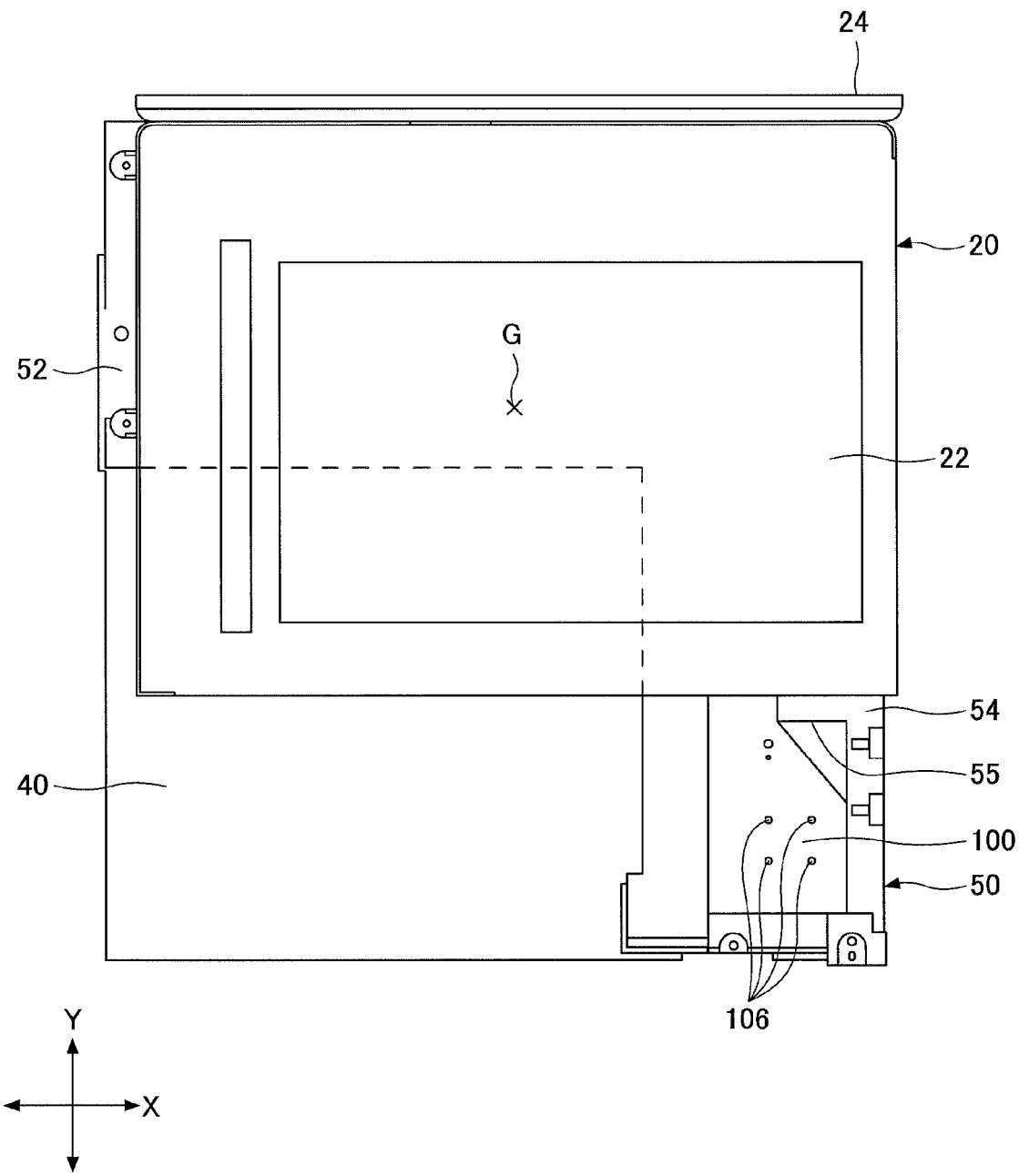
FIG. 6 is a plan view of the image forming unit on which the image reading unit is mounted.

FIG. 6 is a plan view of the image forming unit 30 on which the image reading unit 20 is mounted. As shown in FIG. 6, the image reading unit 20 includes a scanner device disposed below a scanner surface 22 on which a document is placed, and the lid 24 is rotatably attached to the rear part of the scanner surface 22.

About three fourths of the area of the bottom surface of the image reading unit 20 are in contact with the top surface (mounting surface) of the first support portion 52 and the second support portion 54 of the supporting unit 50, and the image reading unit 20 is supported without causing distortion or twisting in the directions of X and Y. The center of gravity G of the image reading unit 20 is located in the first support portion 52, and the image reading unit 20 is stably supported by the supporting unit 50. The image reading unit 20 is supported by the first support portion 52 in which the load is located rearward, and the distortion or twisting by gravity is prevented and good plane accuracy is maintained. The accuracy of image reading will be increased and the quality of image formation will be increased.

Next, the structure of the supporting unit 50 will be described.

Figure 7:
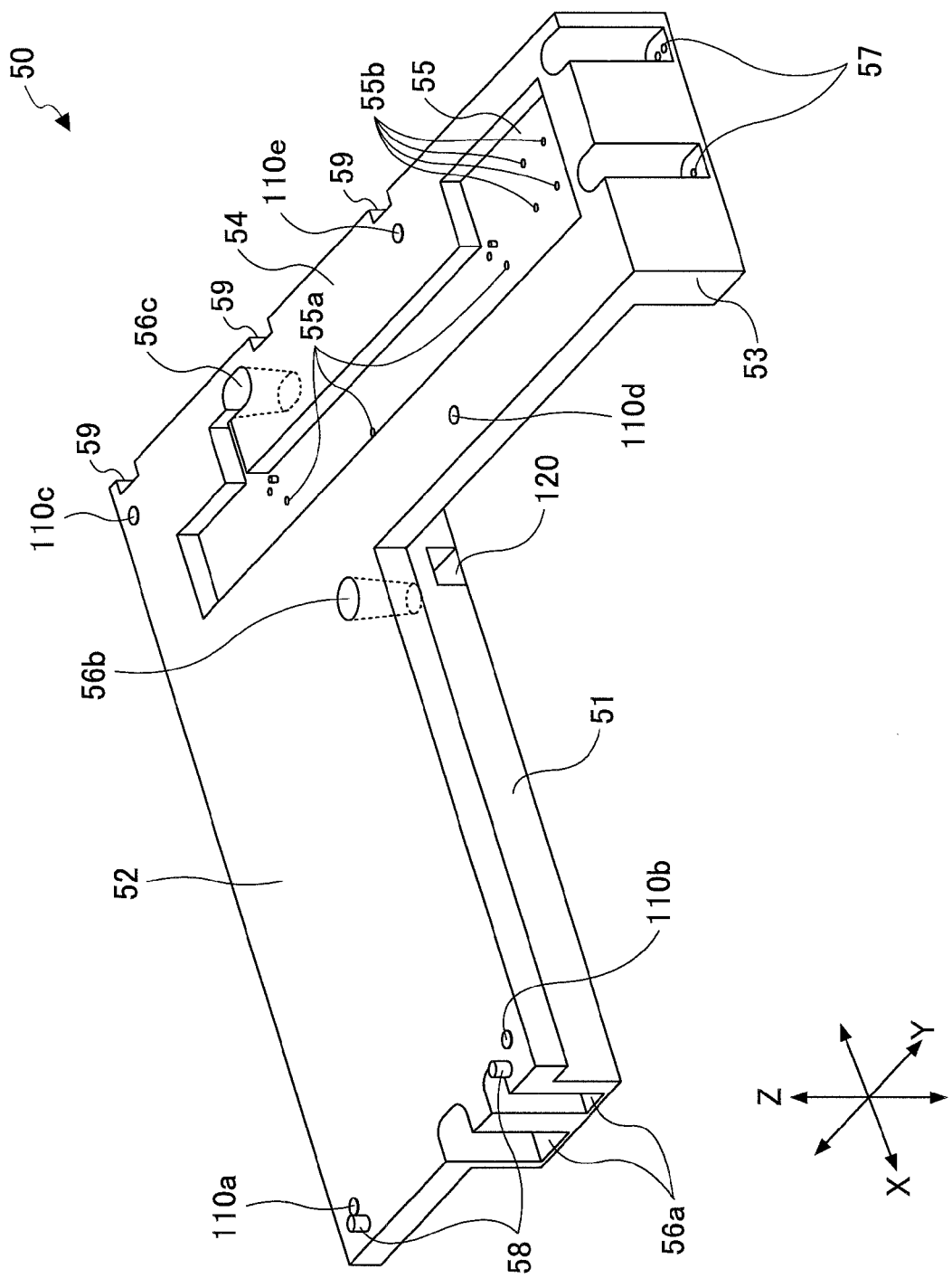
FIG. 7 is a perspective view of the supporting unit.
Figure 8:
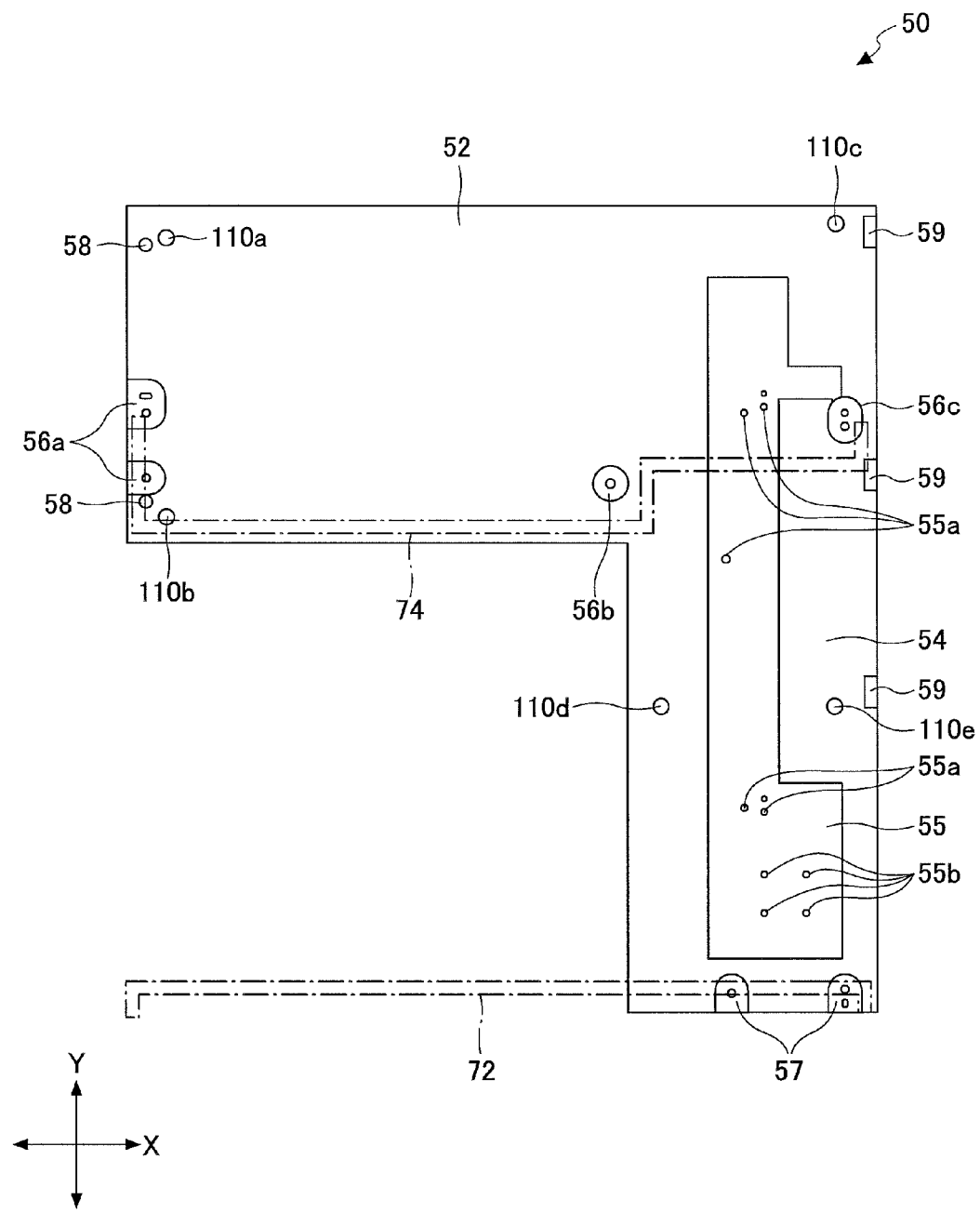
FIG. 8 is a plan view of the supporting unit.

FIG. 7 is a perspective view of the supporting unit 50. FIG. 8 is a plan view of the supporting unit.

As shown in FIG. 7, the supporting unit 50 includes a first contact portion 51 and a second contact portion 53 which are provided on the bottom side of the supporting unit 50, and the first contact portion 51 and the second contact portion 53 are in contact with the upper part of the image forming unit 30.

The first contact portion 51 is formed to project from the bottom surface of the first support portion 52, and the second contact portion 53 is formed to project from the bottom surface of the second support portion 54. The outline configuration of the first contact portion 51 and the second contact portion 53 will be described later.

A number of screw holes 55a for securing the reinforcing member 100 and a number of screw holes 55b for securing a fixing member (which will be described later) to rotatably support the operation unit 60 are formed in the recess 55 in the top surface of the supporting unit 50.

As shown in FIGS. 7 and 8, the supporting unit 50 is an integrally molded part which is formed of a resin material. The weight of the supporting unit 50 can be reduced and the plane accuracy of the mounting surface (the top surface) of the image reading unit 20 can be increased. In the supporting unit 50, fastening recesses 56a are formed at the left side end portions of the first support portion 52 and the fastening recesses 56a are secured to the rear side plate of the housing by screws.

On the right side of the first support portion 52, fastening recesses 56b and 56c are formed and the fastening recesses 56b and 56c are secured to the rear side plate of the housing by screws. Fastening recesses 57 are formed at the front side end portions of the second support portion 54 and the fastening recesses 57 are secured to the front side plate of the housing by screws.

Fastening projections 58 are formed at left side end portions of the first support portion 52 to project from the top surface thereof and the fastening projections 58 are secured to the image reading unit 20. Fastening recesses 59 are formed at the right side end portions of the second support portion 54 and the fastening recesses 59 are secured to the image reading unit 20.

The mounting points 110a-110e where the image reading unit 20 is mounted on the top surface of the supporting unit 50 are formed into cylindrical projections or the like. For example, the mounting points 110a-110e are distributed to the top surface of the left side end portions of the first support portion 52, the top surface of the right side corner portion of the first support portion 52, and the top surface of the front side portions of the second support portion 54. The mounting points 110a-110e are used to support the load of the image reading unit 20 on the top surface of the supporting unit 50 formed in the L-shaped configuration. Therefore, for example, the rolling moment of the image reading unit 20 around the Y-axis is prevented by the left side mounting points 110a and 110b and the right side mounting points 110c and 110e. For example, a pitching moment of the image reading unit 20 around the X-axis is prevented by the rear end mounting points 110a and 110c and the front end mounting points 110d and 110e.

Therefore, distortion and twisting of the image reading unit 20 are prevented by the supporting structure of the supporting unit 50, and the plane accuracy is maintained in a high degree of accuracy. Hence, the image reading accuracy by the image reading unit 20 will be improved and the quality of image formation will be increased.

Further, the supporting unit 50 is supported by the front vertical frame 72 and the rear vertical frame 74 of the frame body 70 as indicated by the one-dot chain lines in FIG. 8. The fastening recesses 56a-56c and 57 for securing the supporting unit 50 to the upper part of the image forming unit 30 are formed at the locations which substantially overlap with the locations of the front vertical frame 72 and the rear vertical frame 74 of the frame body 70 respectively. Therefore, the supporting unit 50 receives the load of the image reading unit 20 on the mounting points 110a-110e on the side of the top surface, and the supporting unit 50 is supported by the front vertical frame 72 and the rear vertical frame 74 disposed in the vicinity of the fastening recesses 56a-56c and 57 on the side of the bottom surface.

Accordingly, the load of the image reading unit 20 and the supporting unit 50 is stably supported by the front vertical frame 72 and the rear vertical frame 74. Namely, the image reading unit 20 is stably supported by the relative position between the supporting unit 50 and the front and rear vertical frames 72 and 74. Distortion and twisting are prevented and the plane accuracy is maintained in a high degree of accuracy. Hence, the image reading accuracy will be improved and the quality of image formation will be increased.

Figure 9:
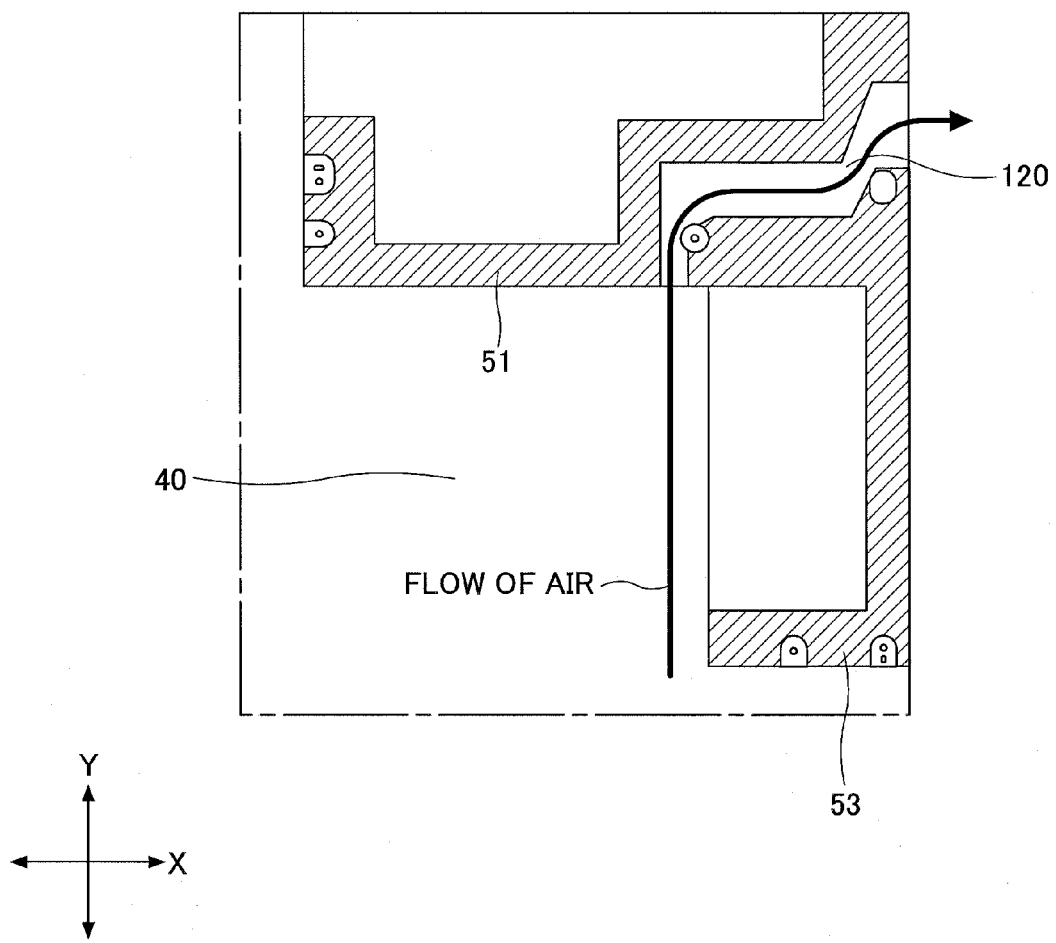
FIG. 9 is a plan view of an air passage in the supporting unit.
Figure 10:
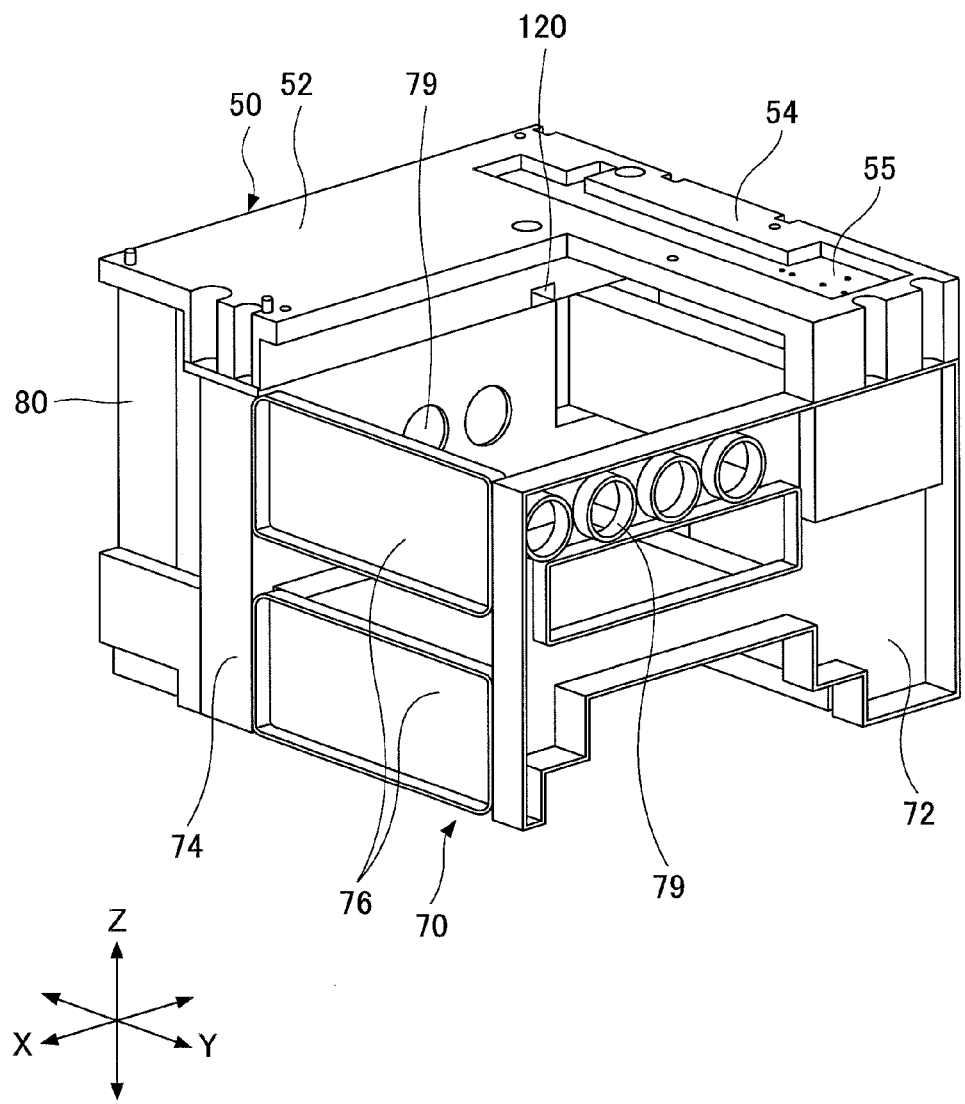
FIG. 10 is a perspective view of the air passage in the supporting unit.

FIG. 9 is a plan view of an air passage of the supporting unit 50. FIG. 10 is a perspective view of the air passage of the supporting unit 50.

As shown in FIG. 9 and FIG. 10, the supporting unit 50 includes the first contact portion 51 and the second contact portion 53 on the bottom surface. The first contact portion 51 and the second contact portion 53 are wall parts which are formed as indicated by the hatching in FIG. 9. An air passage 120 is formed between the first contact portion 51 and the second contact portion 53, and the sheet ejection space 40 communicates with the exterior via the air passage 120. One end of the air passage 120 is open to the sheet ejection space 40, and the other end of the air passage 120 is open to the exterior through the right-hand side face of the supporting unit 50.

The supporting unit 50 is arranged to include the air passage 120 for discharging the air in the sheet ejection space 40 to the outside. It is not necessary to provide an additional ventilation duct in the supporting unit 50. Hence, the number of component parts for the supporting unit 5 can be decreased and the cost of the manufacture can be reduced.

Figure 11A:
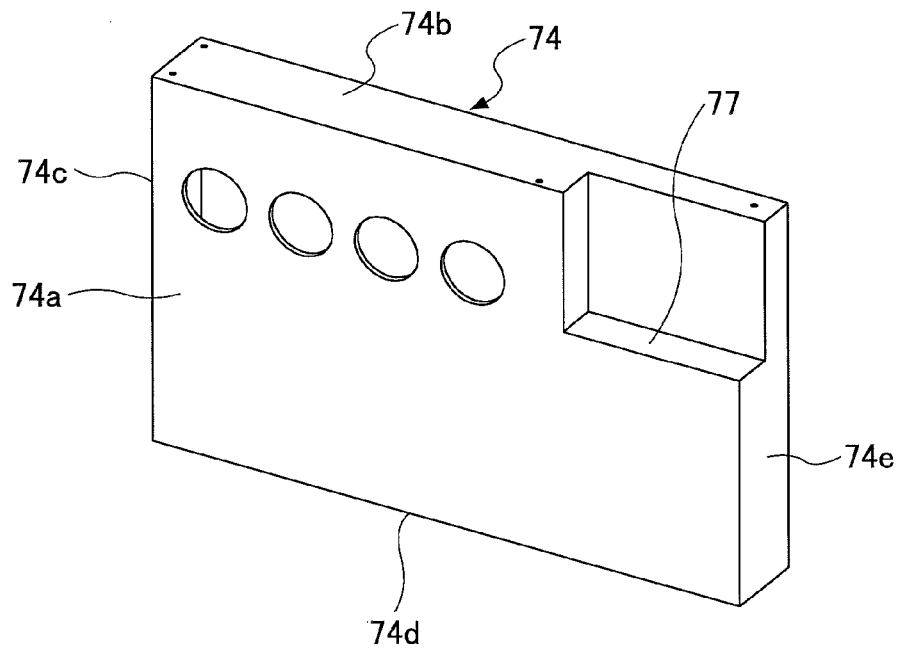
FIG. 11A is a perspective view of a front side of a rear vertical frame when viewed from a slanting upper position.
Figure 11B:
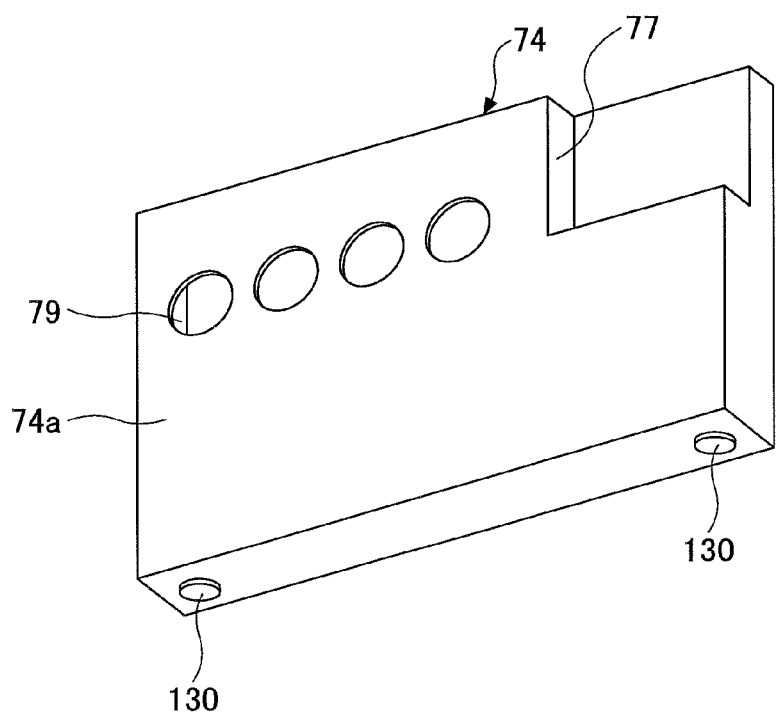
FIG. 11B is a perspective view of the front side of the rear vertical frame when viewed from a slanting lower position.
Figure 11C:
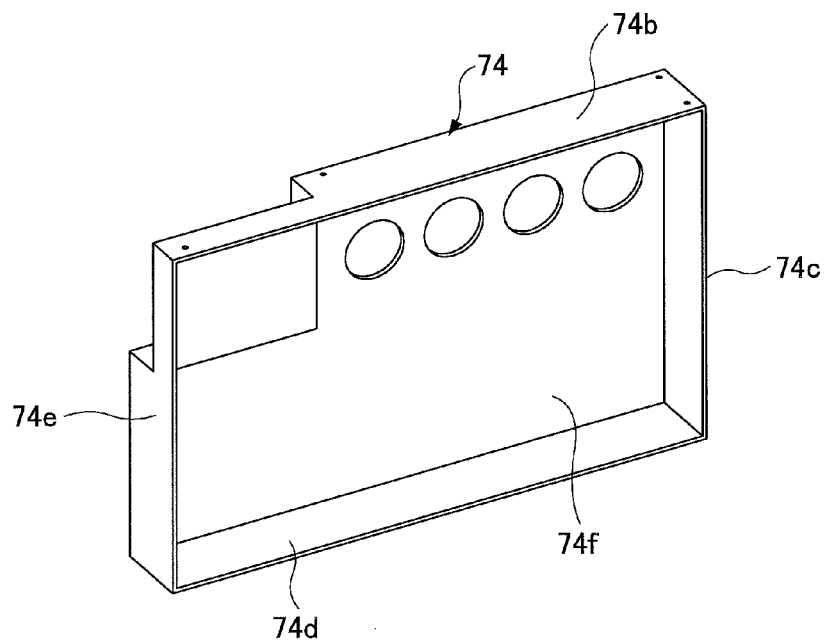
FIG. 11C is a perspective view of a rear-end side of the rear vertical frame when viewed from a slanting upper position.
Figure 11D:
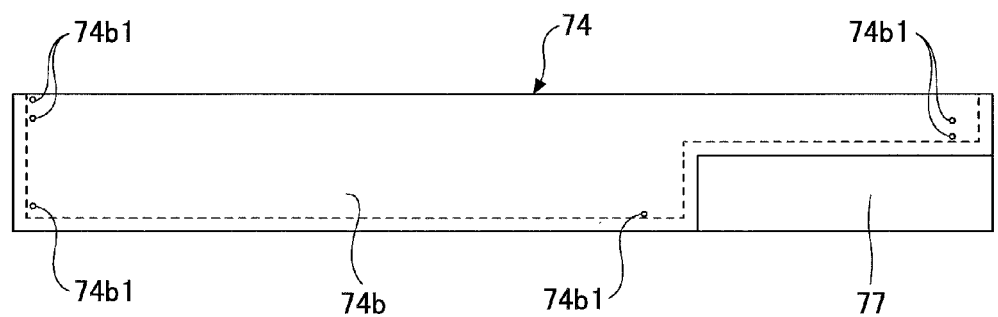
FIG. 11D is a plan view of the rear vertical frame.

FIG. 11A is a perspective view of the front side of the rear vertical frame 74 when viewed from a slanting upper position. FIG. 11B is a perspective view of the front side of the rear vertical frame 74 when viewed from a slanting lower position. FIG. 11C is a perspective view of the rear side of the rear vertical frame 74 when viewed from a slanting upper position. FIG. 11D is a plan view of the rear vertical frame 74.

As shown in FIGS. 11A-11C, the rear vertical frame 74 includes a vertical wall 74a, and a top surface 74b, a left-hand side face 74c, a bottom surface 74d and a right-hand side face 74e which are respectively formed by bending the four sides of the vertical wall 74a by the right angle. A recess portion 74f is formed on the rear side of the vertical wall 74a and this recess portion 74f is surrounded by the top surface 74b, the left-hand side face 74c, the bottom surface 74d and the right-hand side face 74e. In the vertical wall 74a, a step portion 77 and a plurality of the mounting holes 79 are formed, and the right-hand side plate frame 78 is fixed at one end to the step portion 77.

The rear vertical frame 74 is a part which is formed of a sheet metal material, and includes the top surface 74b, the left-hand side face 74c, the bottom surface 74d and the right-hand side face 74e which are respectively formed by bending the four sides of the vertical wall 74a by the right angle. Thus, the rear vertical frame 74 has adequate strength for supporting the load of the image reading unit 20 and the supporting unit 50, and the weight of the rear vertical frame 74 may be reduced.

An elastic member 130 is formed of a rubber material and fixed to the bottom surface 74d of the rear vertical frame 74. The elastic member 130 has good viscoelasticity for absorbing vibrations and external force.

As shown in FIG. 11D, fastening holes 74b1 are formed in the top surface 74b of the rear vertical frame 74 in the vicinity of the respective corners of the supporting unit 50, and the fastening holes 74b1 are provided for fastening the supporting unit 50.

The front vertical frame 72 has the structure which is essentially the same as that of the rear vertical frame 74 described above, and a description thereof will be omitted.

Figure 12:
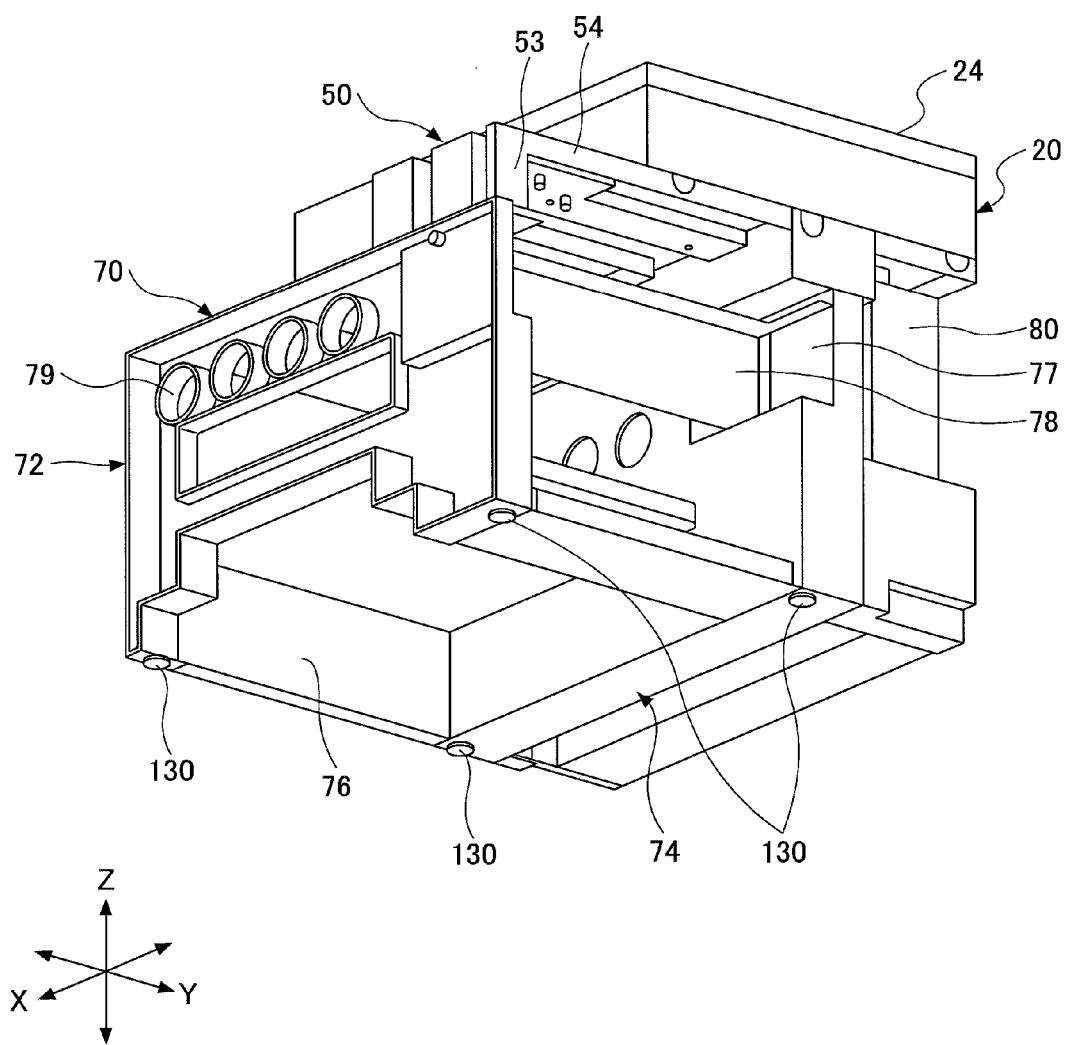
FIG. 12 is a perspective view of the frame structure of the image forming unit when viewed from a slanting lower position.

FIG. 12 is a perspective view of the frame structure 70 of the image forming unit 30 when viewed from a slanting lower position. As shown in FIG. 12, a plurality of elastic members 130 are attached to the bottom surfaces of the front vertical frame 72 and the rear vertical frame 74.

Each elastic member 130 is attached to the bottom of the image forming device 10 and contacts the setting surface (the floor surface) on which the image forming device 10 is set up. Therefore, the full load of the image forming device 10 is supported by the elastic members 130 through the front vertical frame 72 and the rear vertical frame 74. If an appropriate viscoelastic coefficient of a rubber material which forms the elastic member 130 is selected according to the oscillation characteristic (natural-oscillation feature) of the image forming device 10, the undesired influence of vibrations on the image reading unit 20 can be effectively attenuated.

For example, when the weight of the operator is placed on the image reading unit 20 by his hand, the deformation by the load is absorbed by the elastic deformation of the elastic members 130, and the frame structure 70 is not deformed. Distortion or twisting of the image reading unit 20 does not take place, and deterioration of the image reading accuracy is prevented. Hence, even when external force is exerted on the image forming device 10, the quality of image formation can be maintained.

Figure 13:
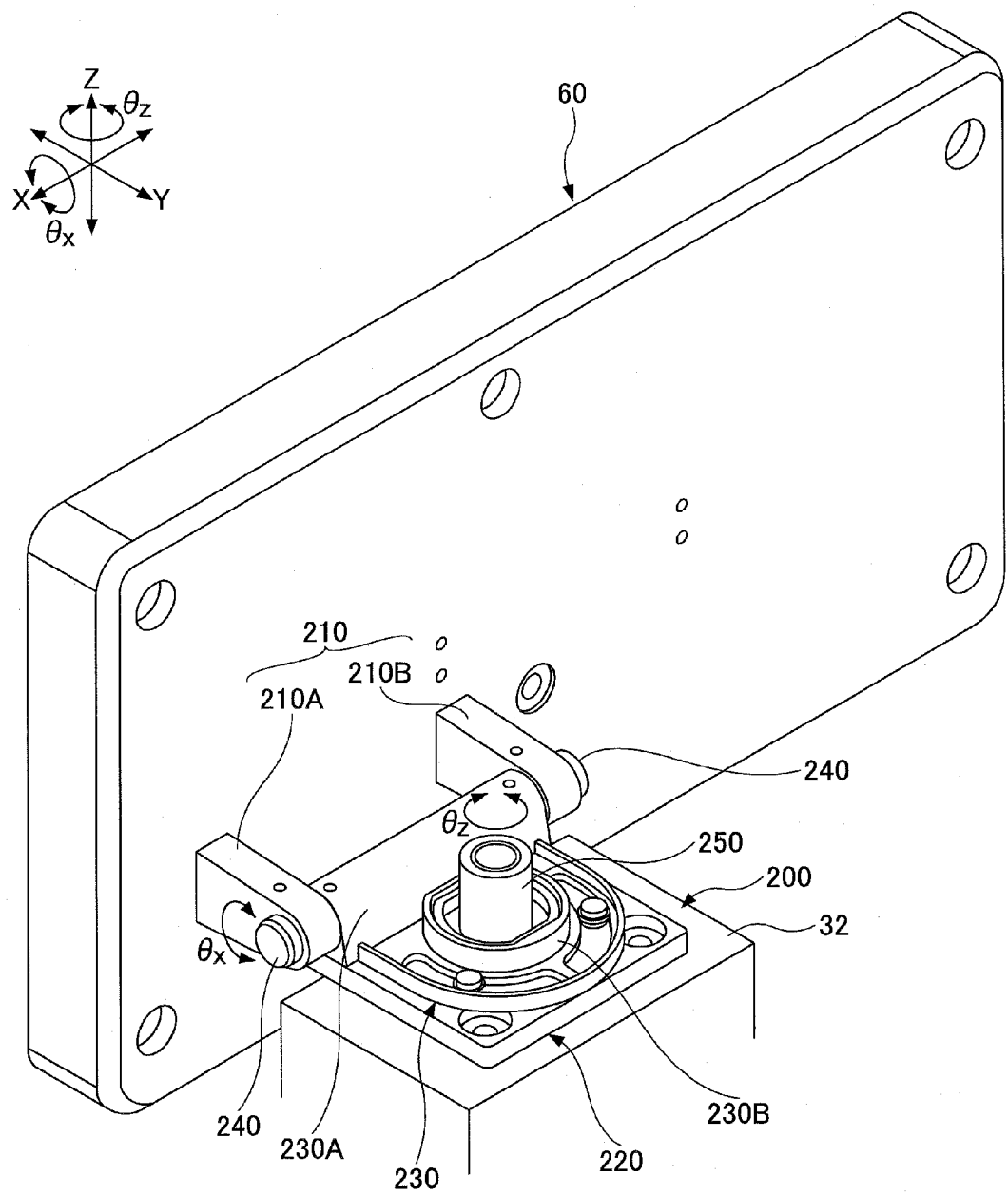
FIG. 13 is a perspective view of a supporting device of an operation unit when viewed from a slanting rear position.
Figure 14:
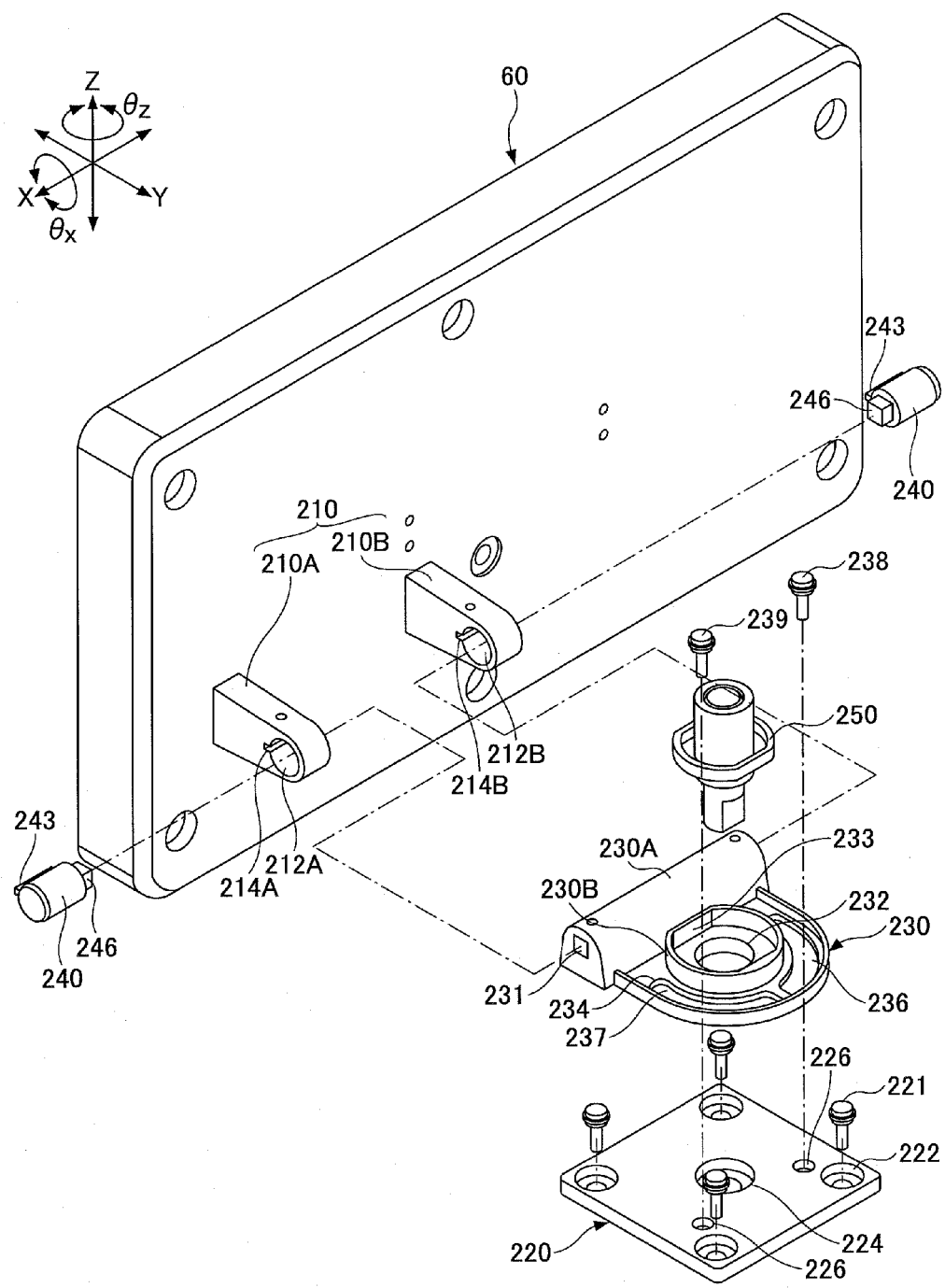
FIG. 14 is an exploded perspective view of the supporting device of the operation unit when viewed from a slanting rear position.

FIG. 13 is a perspective view of a supporting device 200 of the operation unit 60 when viewed from a slanting rear position. FIG. 14 is an exploded perspective view of the supporting device 200 of the operation unit 60 when viewed from a slanting rear position. As shown in FIGS. 13 and 14, the supporting device 200 is fixed to an upper mounting portion 32 of the image forming unit 30 and the operation unit 60 is rotatably supported by the supporting device 200. The supporting device 200 supports the rear face of the operation unit 60 rotatably in any of the vertical direction (the direction of θx) and the horizontal direction (the direction of θz). Further, the supporting device 200 is arranged to hold the operation unit 60 at an arbitrary rotated position.

Specifically, the supporting device 200 includes a support portion (a first fixing portion) 210, a fixing base (a second fixing portion) 220, and a hinge unit 230. The support portion 210 includes a pair of arm parts 210A and 210B fixed to the rear-end face of the operation unit 60. These arm parts 210A and 210B project from the rear-end face of the operation unit 60 in parallel to each other. Bearing holes 212A and 212B are formed in the end portions of the arm parts 210A and 210B which confront each other, and the bearing holes 212A and 212B penetrate the arm parts 210A and 210B respectively in the direction of X.

The bottom surface of the fixing base 22 is disposed on the upper mounting portion 32 of the image forming unit 30. Four fastening screws 221 are fitted into the screw holes 55b of the supporting unit 50 and the fixing base 220 is fixed to the image forming unit 30. Four fastening holes 222 are formed in the corner parts of the top surface of the fixing base 220, a non-circular recess 224 is formed in the center of the top surface of the fixing base 220, and a pair of screw holes 226 for securing the hinge unit 230 are formed in the top surface of the fixing base 220.

The hinge unit 230 includes a first hinge 230A and a second hinge 230B. The first hinge 230A is connected to the arm parts 210A and 210B to be rotatable in the vertical direction (the direction of θx), and the second hinge 230B is connected to the fixing base 220 to be rotatable in the horizontal direction (the direction of θz).

The first hinge 230A is interposed between the arm parts 210A and 210B, and a pair of first torque hinges 240 from right and left side positions in the direction of X are fitted into the first hinge 230A interposed. The second hinge 230B is disposed on the top surface of the fixing base 220, and a second torque hinge 250 from an upper position is fitted into the second hinge 230B. Each of the torque hinges 240 and 250 includes a torque generating part which generates torque for holding the operation unit 60 in its rotated position by a relative displacement between the inner peripheral portion and the outer peripheral portion of the torque hinge, which will be described later.

Further, the hinge unit 230 includes a fitting part 232 and a rotation limiting part 234. The fitting part 232 is fitted to the outer peripheral portion of the second torque hinge 250. The rotation limiting part 234 is formed in the circumference of the fitting part 232 and extends in the horizontal direction (the direction of θz). The outer peripheral portion of the second torque hinge 250 has a non-circular configuration (for example, the shape of an ellipse or the like), and the wall part 233 of the fitting part 232 is formed to have a non-circular configuration corresponding to that of the outer peripheral portion of the second torque hinge 250. The lower end of the second torque hinge 250 passes through the fitting part 232 and is fitted to the non-circular recess 224 of the fixing base 220.

The rotation limiting part 234 includes a pair of arc-shaped through holes 236 and 237 which are formed in the shape of a concentric circle coaxially with the circumference of the fitting part 232. Screws 238 and 239 from an upper position are inserted in the arc-shaped through holes 236 and 237 respectively, and the rotatable range of the hinge unit 230 in the horizontal direction (in the direction of θz) is limited according to a relative position between the arc-shaped through holes 236 and 237 and the screws 238 and 239. Hence, the hinge unit 230 is rotatable until the end of one of the arc-shaped through holes 236 and 237 contacts the corresponding one of the screws 238 and 239.

The screws 238 and 239 are fitted to the fixing base 220 at the positions which are symmetrical with respect to the centerline of the fixing base 220, and the rear side of the hinge unit 230 is secured to the fixing base 220 without being lifted from the fixing base 220. The rotatable range of the hinge unit 230 in the horizontal direction (in the direction of θz) is limited to the positions which are equally at a predetermined angle to the both sides of the centerline of the fixing base 220.

Figure 15A:
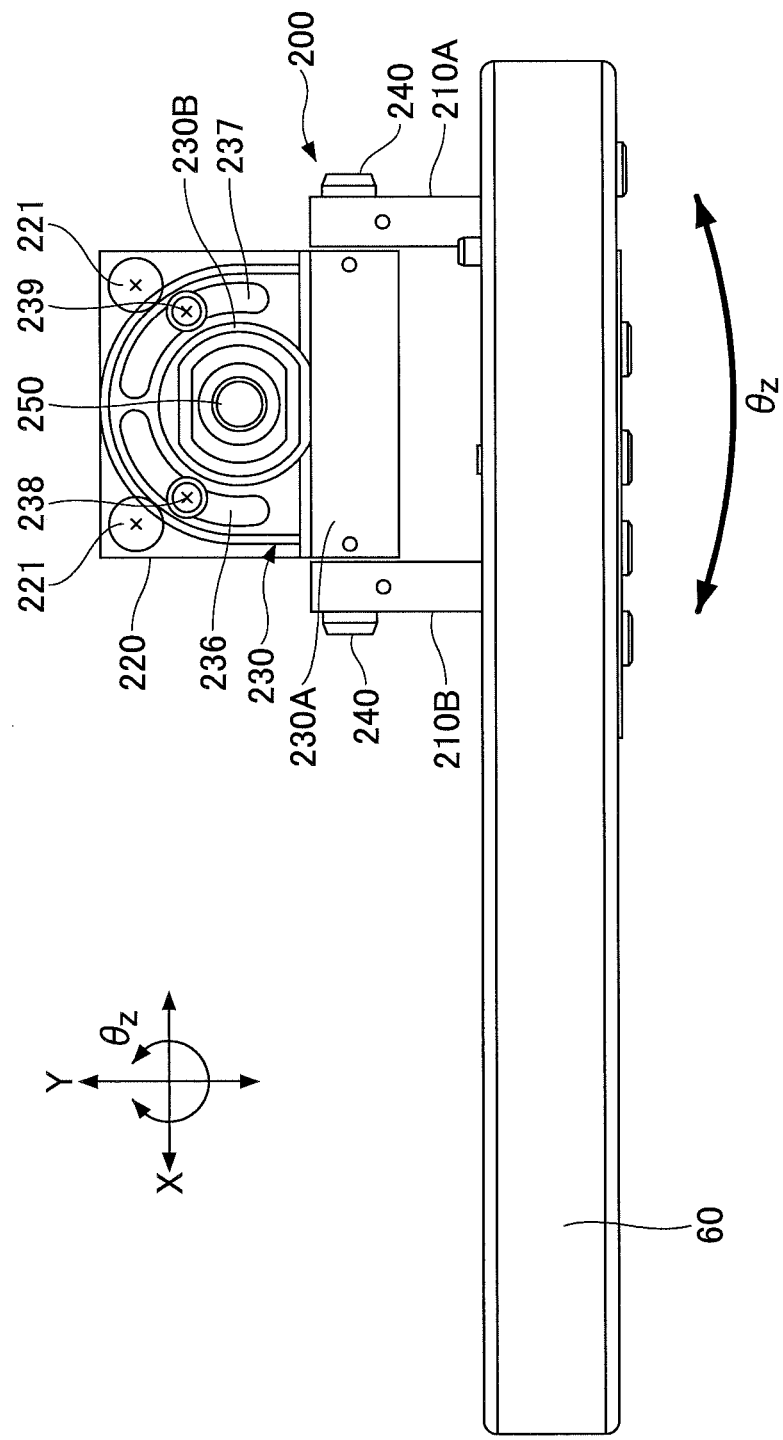
FIG. 15A is a plan view of the supporting device of the operation unit.

FIG. 15A is a plan view of the supporting device 200 of the operation unit 60. As shown in FIG. 15A, the operation unit 60 is supported by the supporting device 200 and rotatable in the horizontal direction (the direction of θz) around the second torque hinge 250 (which is fitted to the hinge unit 230) as a rotation center. When the operation unit 60 faces the front position, the screws 238 and 239 are located mostly at the midpoints of the arc-shaped through holes 236 and 237 respectively.

The head of each of the screws 238 and 239 has a major diameter which is larger than the width of each of the arc-shaped through holes 236 and 237, and the screws 238 and 239 are guided along the arc-shaped through holes 236 and 237 in the circumferential direction when the hinge unit 230 is rotated in the horizontal direction. At the same time, displacement of the hinge unit 230 to an upper position in the vertical direction (in the direction of θx) is prevented.

The hinge unit 230 is fixed by tightening torque for fastening the screws 238 and 239 to the fixing base 220 and rotatably supported on the fixing base 220 via a clearance between the top surface of the hinge unit 230 and the top surface of the fixing base 220. Hence, the operation unit 60 is supported to be rotatable in the direction of θz around the Z-axis.

Figure 15B:
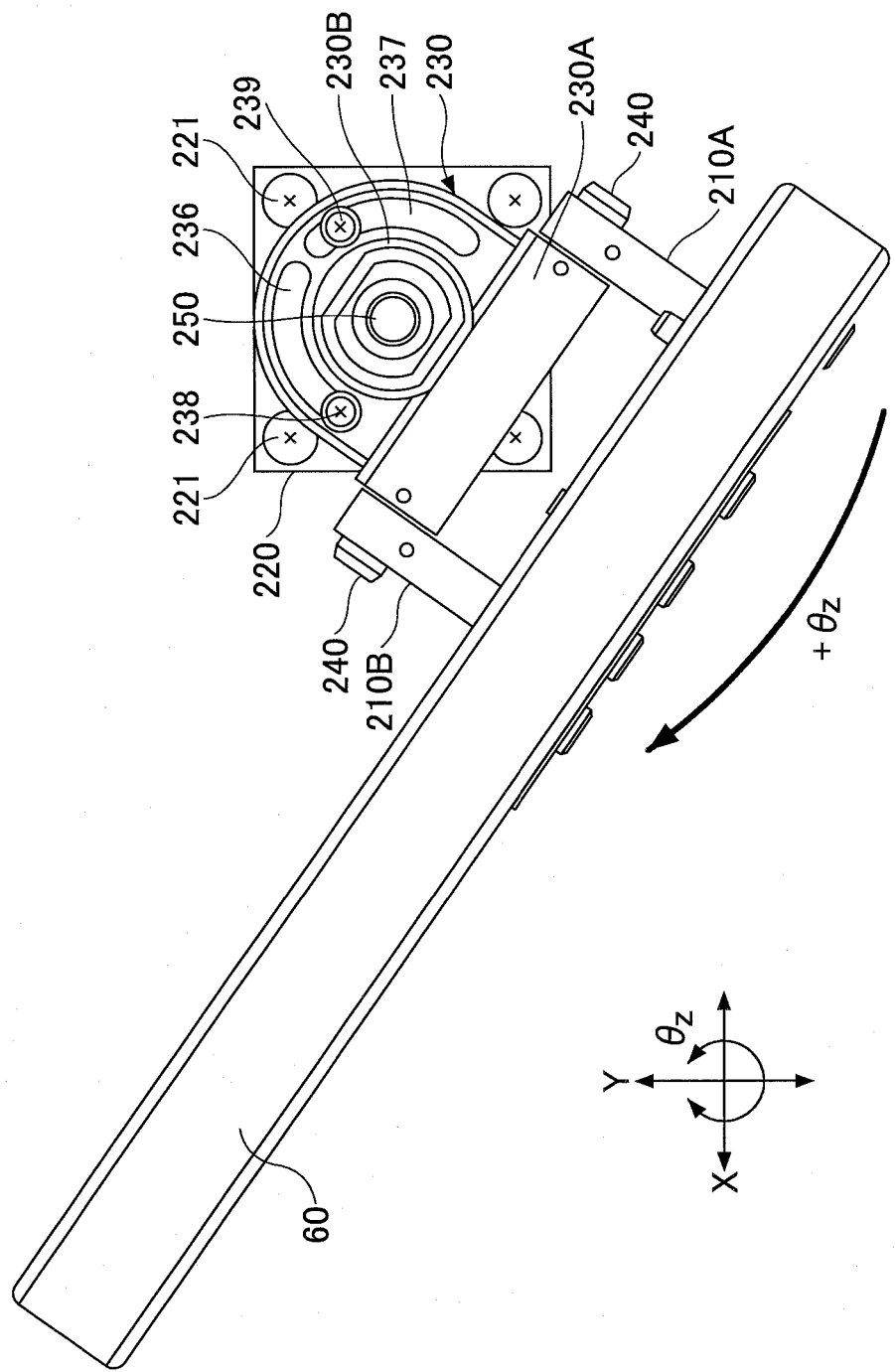
FIG. 15B is a plan view showing the operation of the supporting device when the operation unit is rotated leftward.

FIG. 15B is a plan view showing the operation of the supporting device 200 when the operation unit 60 is rotated leftward. As shown in FIG. 15B, when the operation unit 60 is rotated clockwise, the hinge unit 230 is rotated in the direction of +θz around the second torque hinge 250.

When the operation unit 60 is rotated clockwise (in the direction of +θz), the torque is generated by a relative displacement between the cylindrical-portion side (rotation side) and the shaft side (fixed side) of the second torque hinge 250, and horizontal rattling of the operation unit 60 is prevented by the torque. Hence, the operation unit 60 is stably held in an arbitrary rotated position when the operation unit 60 is rotated in the direction of +θz.

When the operation unit 60 is rotated leftward (clockwise rotation), the left-hand side end portion of the arc-shaped through hole 236 on the left-hand side of the hinge unit 230 is in contact with the left-hand side screw 238, and the clockwise rotation of the operation unit 60 is regulated. In the state in which the operation unit 60 is rotated clockwise, the hinge unit 230 is held to be rotatable to the fixing base 220 through the engagement of the screws 238 and 239 with the arc-shaped through holes 236 and 237.

Figure 15C:
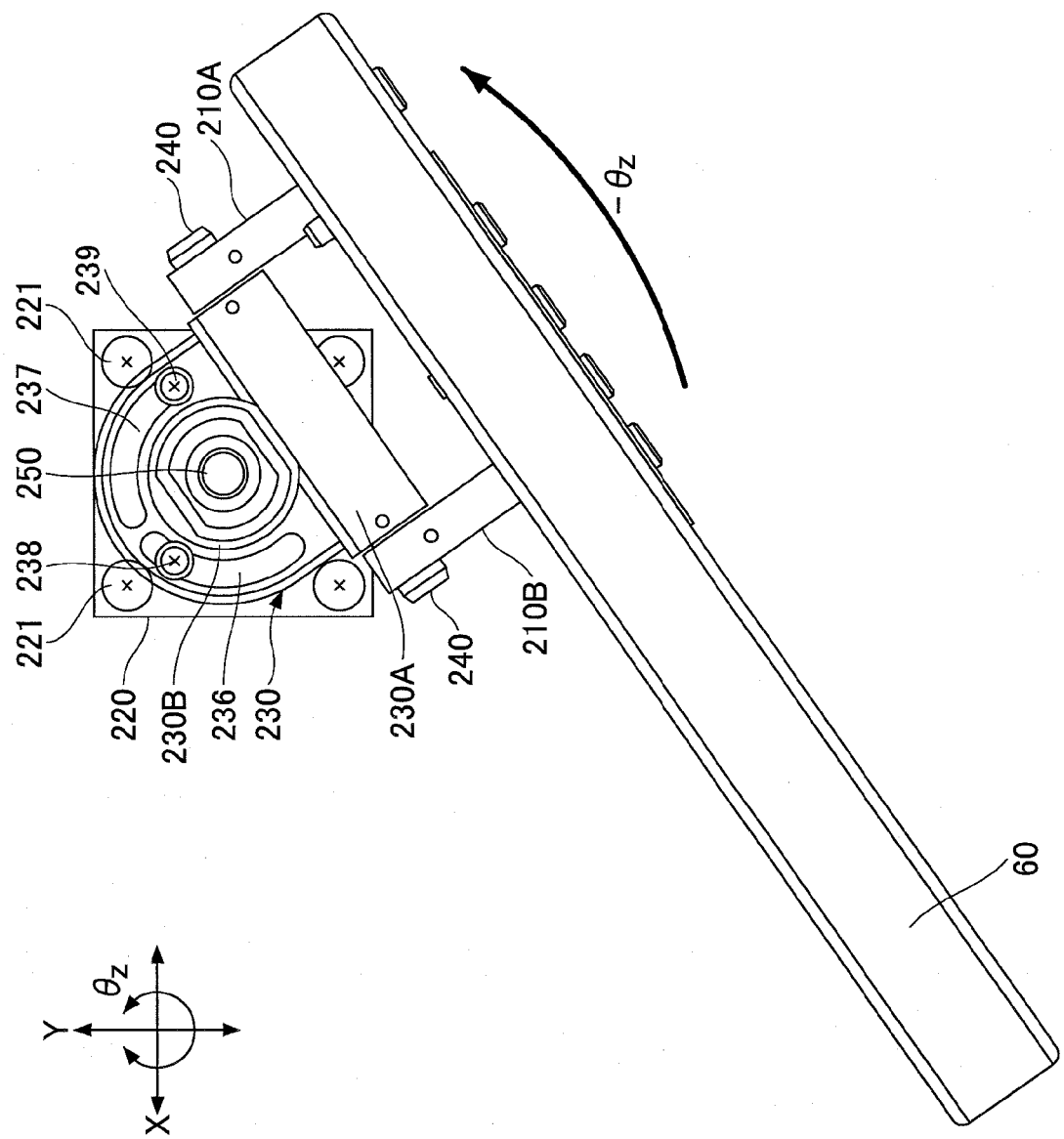
FIG. 15C is a plan view showing the operation of the supporting device when the operation unit is rotated rightward.

FIG. 15C is a plan view showing the operation of the supporting device 200 when the operation unit 60 is rotated rightward. As shown in FIG. 15C, when the operation unit 60 is rotated rightward (counterclockwise), the hinge unit 230 is rotated in the direction of θz around the second torque hinge 250.

When the operation unit 60 is rotated counterclockwise (in the direction of −θz), the torque is generated by a relative displacement between the cylindrical-portion side (rotation side) and the shaft side (fixed side) of the second torque hinge 250, and horizontal rattling of the operation unit 60 is prevented by the torque. Hence, the operation unit 60 is stably held in an arbitrary rotated position when the operation unit 60 is rotated in the direction of −θz.

When the operation unit 60 is rotated rightward (counterclockwise), the right-hand side end portion of the arc-shaped through hole 237 on the right-hand side of the hinge unit 230 is in contact with the right-hand side screw 239, and the counterclockwise rotation of the operation unit 60 is regulated. In the state in which the operation unit 60 is rotated counterclockwise, the hinge unit 230 is held to be rotatable to the fixing base 220 through the engagement of the screws 238 and 239 with the arc-shaped through holes 236 and 237.

The hinge unit 230 is rotatable in the direction of θz around the second torque hinge 250, and when the operation unit 60 is rotated in the horizontal direction (the direction of θz) clockwise or counterclockwise, the torque is generated by a relative displacement between the cylindrical-portion side (rotation side) and the shaft side (fixed side) of the second torque hinge 250, and rattling of the operation unit 60 in the horizontal rotational operation is prevented. The rotatable range of the operation unit 60 supported by the hinge unit 230 in the horizontal direction (the direction of θz) is regulated according to the relative position between the screws 238 and 239 and the arc-shaped through holes 236 and 237.

Figure 16A:
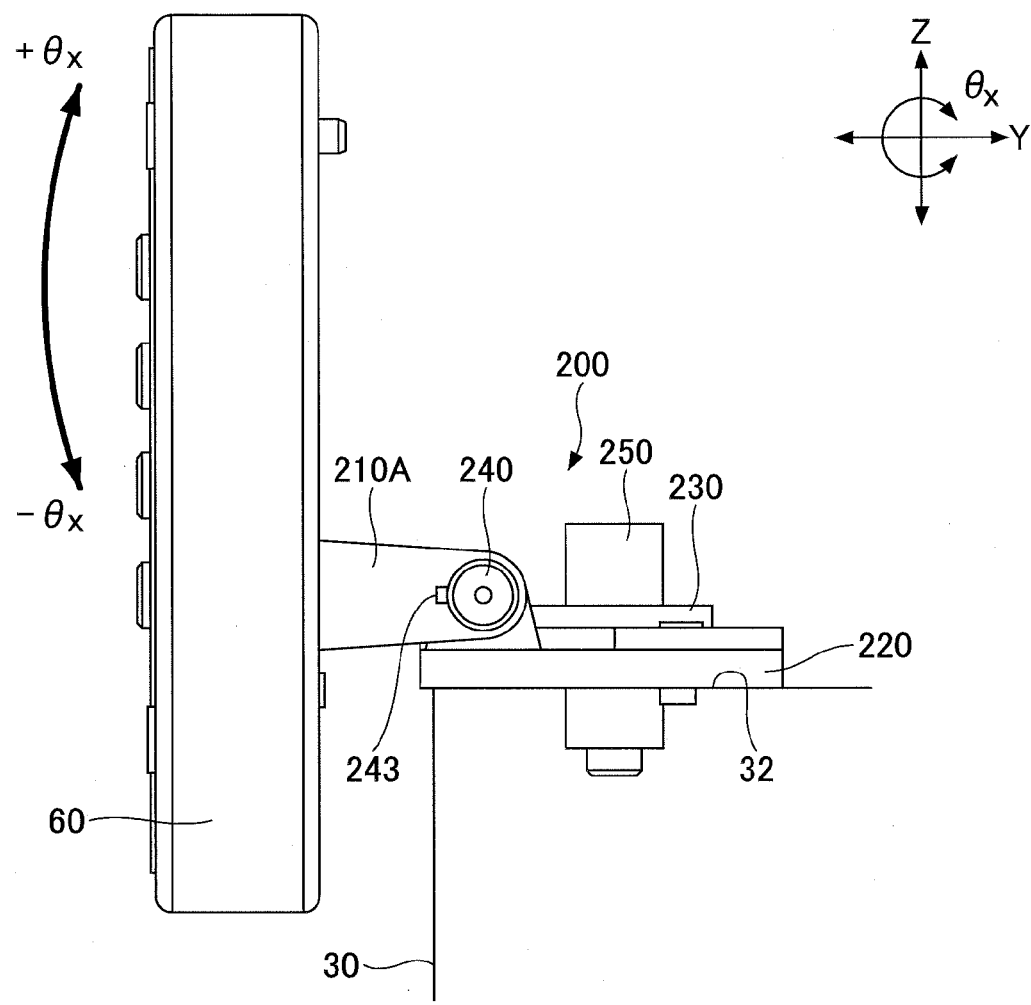
FIG. 16A is a side view of the supporting device of the operation unit when viewed from a right-hand side position.

FIG. 16A is a side view of the supporting device 200 of the operation unit 60 when viewed from a right-hand side position. As shown in FIG. 16A, the operation unit 60 is supported to be rotatable in the vertical direction (in the direction of θx) by the first torque hinge 240 which is fitted into the bearing holes 212A and 212B of the arm parts 210A and 210B.

In this embodiment, the operation unit 60 can be rotated to an upper position (in the direction of +θx) from the upright condition in which the front operation surface thereof stands uprightly. However, the bottom surfaces of the arm parts 210A and 210B contact the fixing base 220, and downward rotation of the operation unit 60 from the upright condition to a lower position (in the direction of −θx) is restricted.

The annular side of the first torque hinge 240 is fitted into each of the bearing holes 212A and 212B of the arm parts 210A and 210B, and the shaft side of the first torque hinge 240 is fitted into each of the engaging recesses 231 of the first hinge 230A of the hinge unit 230. Hence, the position of the operation unit 60 may be adjusted to an arbitrary rotated position in the vertical direction which is desired by an operator. The torque is generated by a relative displacement between the cylindrical-portion side (rotation side) and the shaft side (fixed side) of the first torque hinge 240, and rattling of the operation unit 60 in the vertical direction is prevented.

Figure 16B:
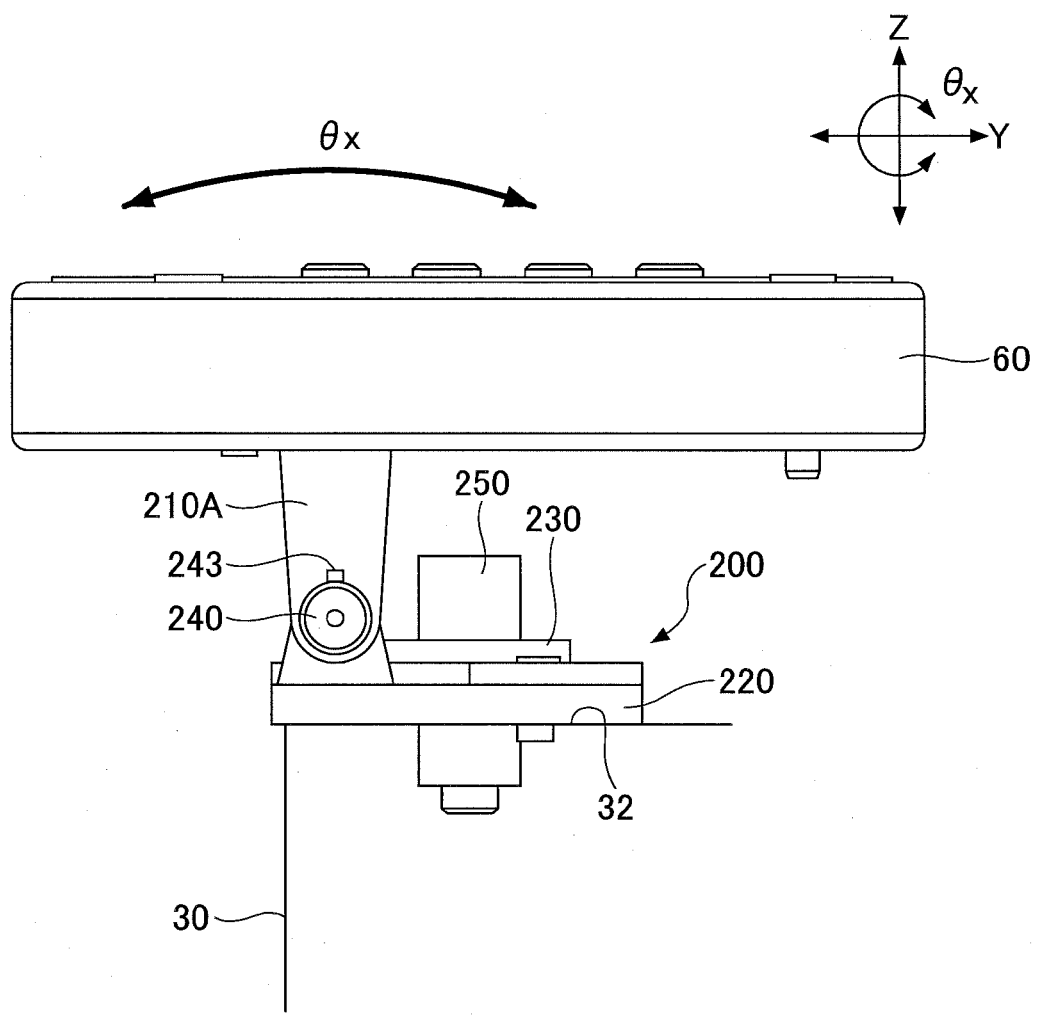
FIG. 16B is a side view showing the condition of the operation unit when the operation unit is rotated upward by 90 degrees.

FIG. 16B is a side view showing the condition of the operation unit 60 when the operation unit 60 is rotated upward by 90 degrees. The supporting device 200 of the operation unit 60 is rotatable so that the operation surface of the operation unit 60 faces upward as shown in FIG. 16B.

In this case, when the operation unit 60 is rotated in the vertical direction (in the direction of θx), the torque in the vertical direction (in the direction of θx) is generated by the relative displacement between the cylindrical-portion side and the shaft side of the first torque hinge 240, and the operation unit 60 is stably held in an arbitrary rotated position in the vertical direction.

Figure 17:
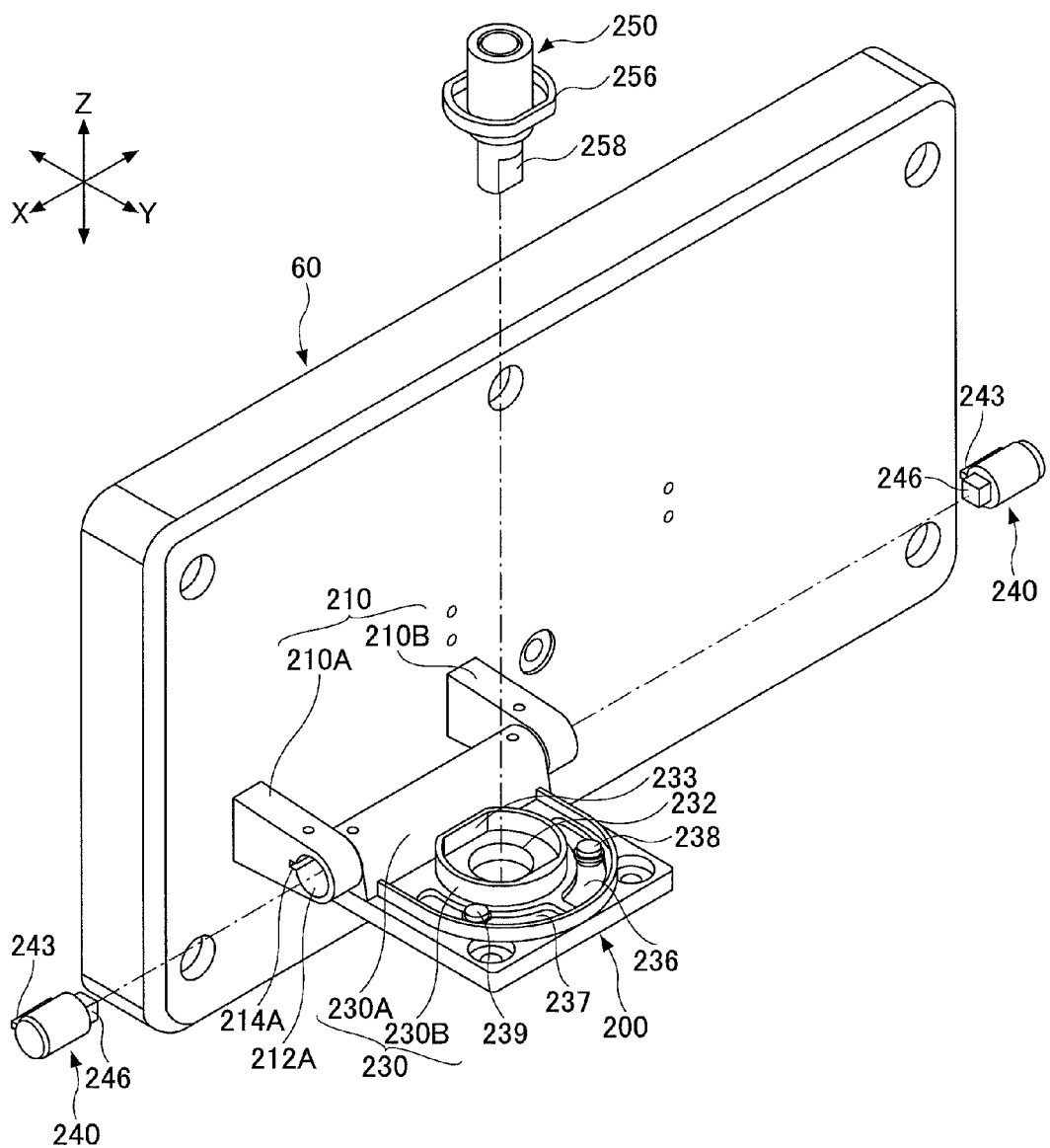
FIG. 17 is an exploded perspective view of respective hinges to support the operation unit rotatably in any of vertical and horizontal directions.

FIG. 17 is an exploded perspective view of the respective hinges for supporting the operation unit 60 rotatably in the vertical and horizontal directions. As shown in FIG. 17, the supporting device 200 includes the first torque hinges 240 which become the rotation center in the direction of θx, and the second torque hinge 250 which becomes the rotation center in the direction of θz.

Figure 18A:
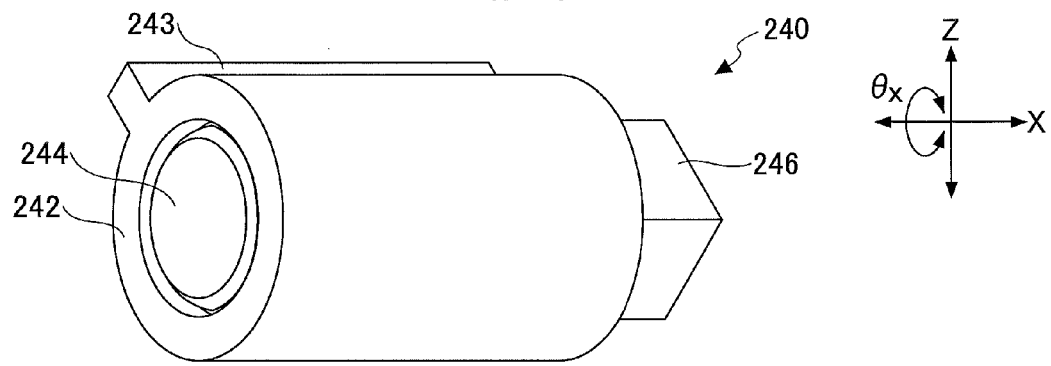
FIG. 18A is an enlarged perspective view of a first torque hinge to support the operation unit rotatably in a vertical direction.

FIG. 18A is an enlarged perspective view of the first torque hinge 240 to support the operation unit 60 rotatably in the vertical direction. As shown in FIG. 18A, the first torque hinge 240 includes a cylindrical housing 242 made of a resin material, and a metallic shaft 244 of the shaft side press fitted into the hollow hole which penetrates the resin housing 242. The resin housing 242 has a projection 243 which projects from the outer periphery of the housing in a radial direction. A connecting portion 246 is formed at the end of the metallic shaft 244 and the connecting portion 246 has a rectangular cross-section.

The projection 243 of the resin housing 242 is fitted into each of the locking grooves 214A and 214B in the bearing holes 212A and 212B of the arm parts 210A and 210B and fixed thereto by a setscrew which will be described later. The connecting portion 246 of the metallic shaft 244 has a rectangular cross-section (a non-circular configuration) and is fitted into each of the engaging recesses 231 in the right and left side faces of the first hinge 230A of the hinge unit 230, so that the rotation of the shaft 244 to the hinge unit 230 is regulated.

The first torque hinge 240 includes the torque generating part which generates torque by friction between the metallic shaft 244 and the resin housing 242 when the operation unit 60 is rotated in the vertical direction (in the direction of θx). Hence, when the operation unit 60 is rotated in the vertical direction, the first torque hinge 240 generates the torque to prevent rattling of the operation unit 60 in the direction of θx.

Figure 18B:
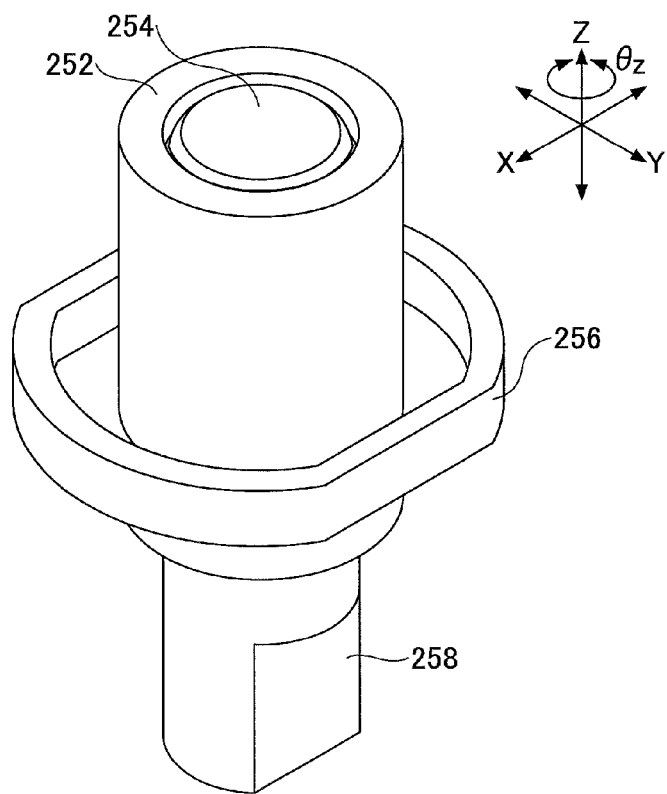
FIG. 18B is an enlarged perspective view of a second torque hinge to support the operation unit rotatably in a horizontal direction.

FIG. 18B is an enlarged perspective view of the second torque hinge 250 to support the operation unit 60 rotatably in the horizontal direction. As shown in FIG. 18B, the second torque hinge 250 includes a resin housing 252 on the cylindrical-portion side of the hinge 250, a metallic shaft 254 on the shaft side of the hinge 250 which is press fitted in the hollow hole which penetrates the resin housing 252, and an elliptical guard portion 256 which is formed integrally with the outer periphery of the resin housing 252. At the lower end of the metallic shaft 254, a connecting portion 258 is formed to have an elliptical cross-section (a non-circular configuration).

The second torque hinge 250 includes the torque generating part which generates torque by a relative displacement between the inner peripheral surface of the resin housing 252 and the outer peripheral surface of the metallic shaft 254.

In the second torque hinge 250, the guard portion 256 of the resin housing 252 is fixed to the fitting part 232 of the hinge unit 230, and the connecting portion 258 of the metallic shaft 254 is fitted into the non-circular recess 224 of the fixing base 220. Hence, when the operation unit 60 is rotated in the horizontal direction (in the direction of θz), a relative displacement between the resin housing 252 and the metallic shaft 254 takes place. When the operation unit 60 is rotated in the horizontal direction, the second torque hinge 250 generates the torque and prevents rattling of the operation unit 60 in the direction of θz.

Figure 19A:
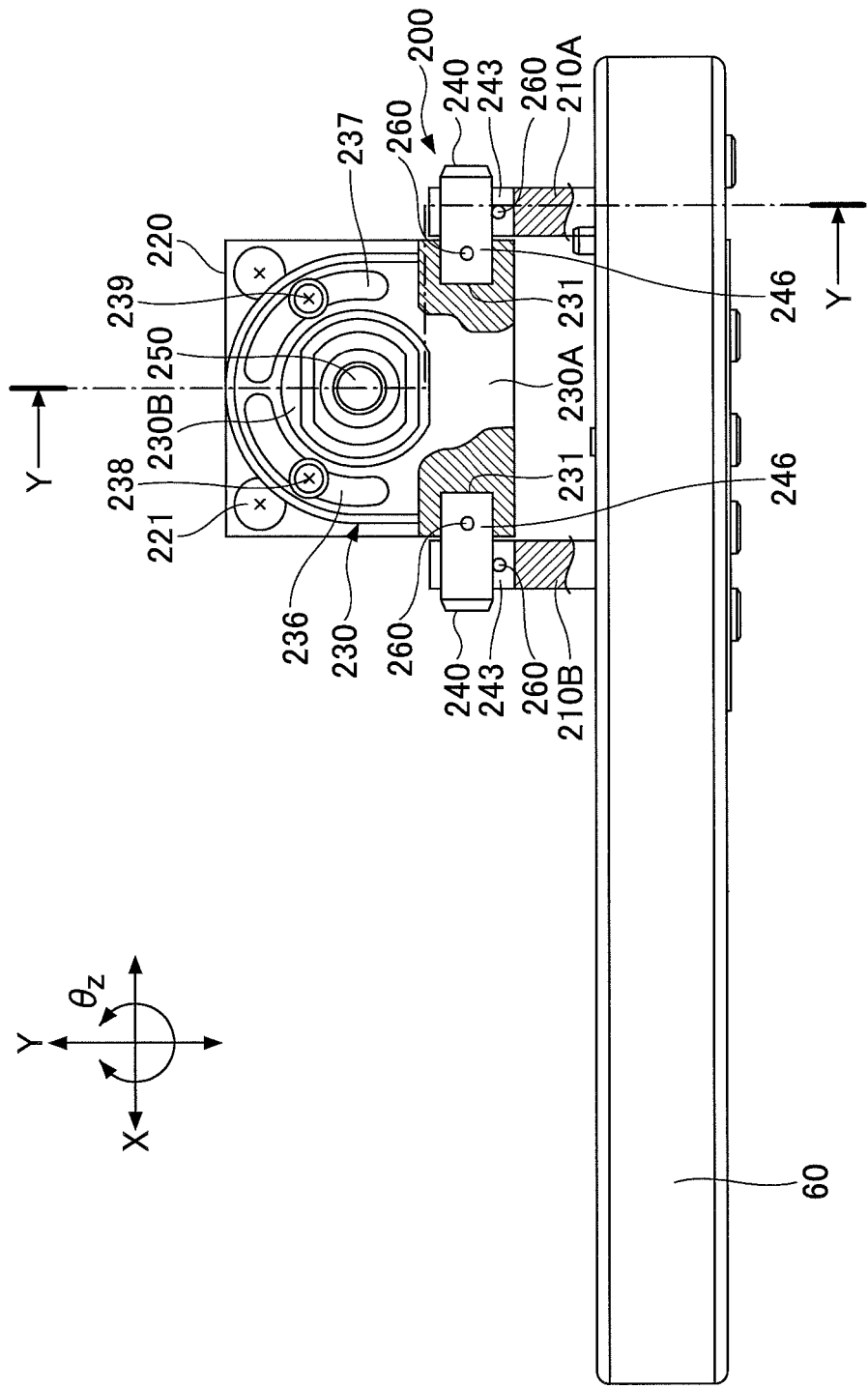
FIG. 19A is a cross-sectional view showing the mounting structure of the first torque hinge to support the operation unit rotatably in the vertical direction.
Figure 19B:
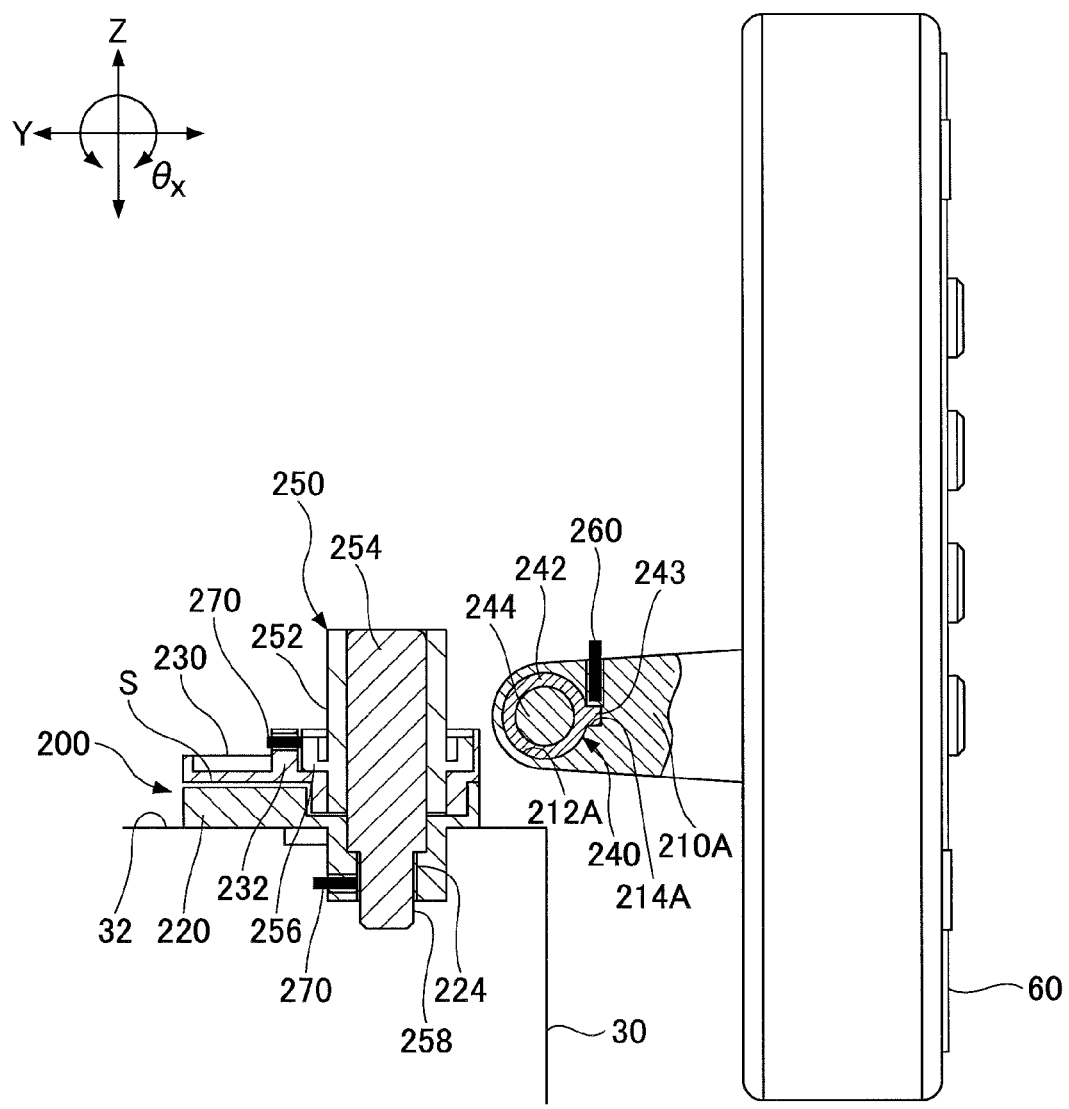
FIG. 19B is a vertical cross-sectional view of the mounting structure of the first torque hinge taken along the Y-Y line indicated in FIG. 19A.

FIG. 19A is a horizontal cross-sectional view showing the mounting structure of the first torque hinge 240 to support the operation unit 60 rotatably in the vertical direction. FIG. 19B is a vertical cross-sectional view of the first torque hinge 240 taken along the Y-Y line indicated in FIG. 19A.

As shown in FIGS. 19A and 19B, the first torque hinges 240 on the both sides in the direction of X are inserted into the holes 212A and 212B of the arm parts 210A and 210B on the rear-end face of the operation unit 60, and the connecting portion 246 at the end of the metallic shaft 244 of each first torque hinge 240 is fitted into the engaging recess 231 in the rectangular shape in the side face of the first hinge 230A of the hinge unit 230.

The metallic shaft 244 of each first torque hinge 240 is engaged with the first hinge 230A of the hinge unit 230. The connecting portion 246 of the metallic shaft 244 is fixed to the first hinge 230A by the setscrew 260 fitted from an upper position, and separation of the metallic shaft 244 from the first hinge 230A is prevented by the setscrew 260.

The projections 243 of the resin housings 242 of the first torque hinges 240 are fixed by the setscrews 260 fitted into the bearing holes 212A and 212B of the arm parts 210A and 210B. Hence, the resin housings 242 of the first torque hinges 240 are engaged with the arm parts 210A and 210B of the operation unit 60.

When the operation unit 60 is rotated in the vertical direction (in the direction of θx), the first resin housings 242 are rotated relative to the metallic shafts 244 of the torque hinge 240, and the torque is generated between the outer peripheral surfaces of the metallic shafts 244 and the inner peripheral surfaces of the resin housings 242. Therefore, the first torque hinges 240 prevent the rattling of the operation unit 60 in the vertical direction when the operation unit 60 is rotated in the vertical direction, so that the operation unit 60 can be held in a predetermined rotated position in the vertical direction.

As shown in FIG. 19B, the second torque hinge 250 is inserted in the second hinge 230B of the hinge unit 230 and the connecting portion 258 at the lower end of the metallic shaft 254 is fitted into the non-circular recess 224 on the bottom of the fixing base 220. The connecting portion 258 is fixed to the fixing base 220 by the setscrew 270 fitted sidewise, and separation of the connecting portion 258 from the fixing base 220 is prevented by the setscrew 270.

The metallic shaft 254 of the second torque hinge 250 is engaged with the fixing base 220. A clearance between the top surface on the outer periphery of the non-circular recess 224 of the fixing base 220 and the bottom surface of the hinge unit 230 is formed.

The guard portion 256 of the resin housing 252 of the second torque hinge 250 is inserted into the fitting part 232 of the hinge unit 230 and fixed to the fitting part 232 by the setscrew 270 fitted from the side of the fitting part 232. The resin housing 252 of the second torque hinge 250 is engaged with the hinge unit 230.

When the operation unit 60 is rotated in the horizontal direction, the hinge unit 230 rotates the fixing base 220. The resin housing 252 and the metallic shaft 254 of the second torque hinge 250 are rotates in the direction of θz relative to each other, and the torque is generated between the outer peripheral surface of the metallic shaft 254 and the inner peripheral surface of the resin housing 252. Therefore, the second torque hinge 250 prevents the rattling of the operation unit 60 when the operation unit 60 is rotated in the horizontal direction, so that the operation unit 60 can be held in a predetermined rotated position.

Next, the structure for prevention of deformation of the second torque hinge 250 will be described.

Figure 20:
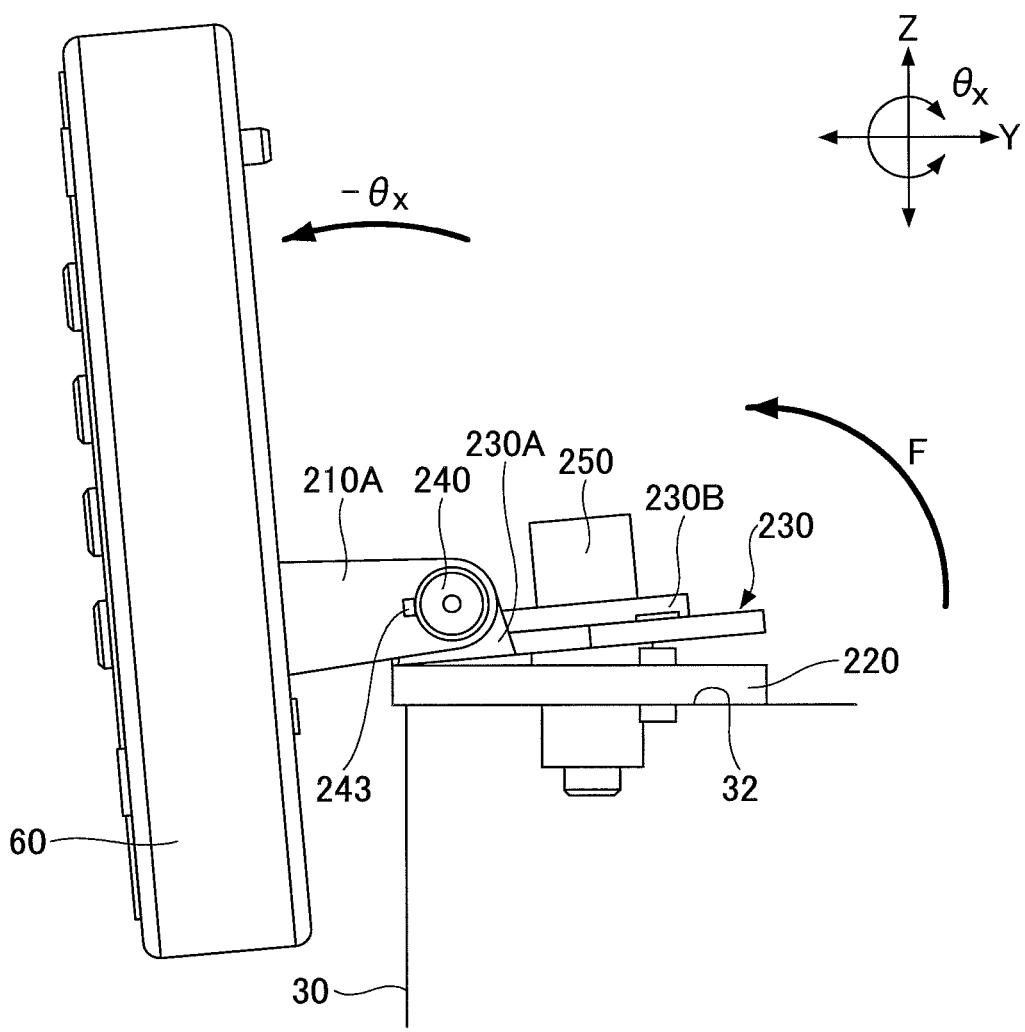
FIG. 20 is a diagram for explaining a defective operation when the hinge to support the operation unit is deformed.

FIG. 20 is a diagram for explaining a defective operation when the hinge for supporting the operation unit 60 is deformed. As shown in FIG. 20, downward rotation of the operation unit 60 from the upright condition to a lower position (in the direction of −θx) is restricted by the structure of the supporting device 200. The arm parts 210A and 210B contact the fixing base 220. However, if external force is applied to rotate the operation unit 60 downward (in the direction of −θx), large force is exerted on the second torque hinge 250 according to the principles of levers, so that there is a possibility that the second torque hinge 250 becomes deformed.

In the supporting device 200, a fixing structure 300 is provided to prevent the inclination of the operation unit 60 by the deformation of the second torque hinge 250.

Figure 21:
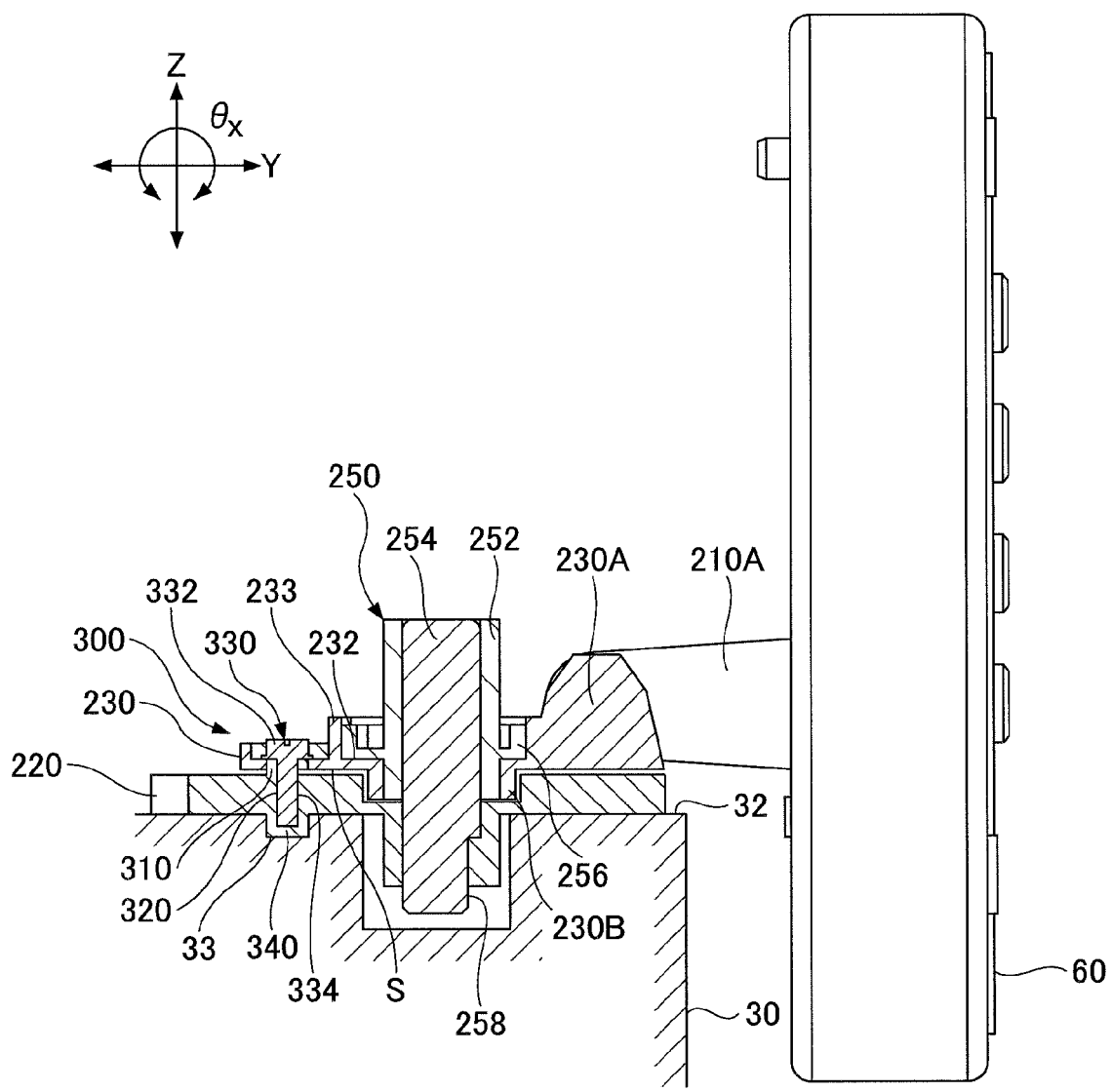
FIG. 21 is a vertical cross-sectional view of a fixing structure of the supporting device.

FIG. 21 is a vertical cross-sectional view of the fixing structure 300 of the supporting device 200. As shown in FIG. 21, the fixing structure 300 includes a pair of upper support portions 310 and a pair of screw holes 320. The upper support portions 310 project from the top surface of the fixing base 220 and rotatably support the hinge unit 230. Each of the screw holes 320 is formed in the top surface of each of the upper support portions 310 in the downward vertical direction. Further, the fixing structure 300 includes a pair of lower support portions 340 which project downward from the bottom surface of the fixing base 220. The lower support portions 340 are located beneath the upper support portions 310 and fitted into the holes 33 of the upper mounting portion 32.

A pair of screws with guard portions (fastening parts) 330 are fitted into the screw holes 320 of the upper support portions 310. The upper support portions 310 are fitted into the arc-shaped through holes 236 and 237 of the hinge unit 230. The guard portion 332 of each screw 330 has a major diameter which is larger than the width of each of the arc-shaped through holes 236 and 237, and the threaded part 334 of each screw 330 is fitted into the screw hole 320 of the support portion 310. The hinge unit 230 is held by the screws with guard portions 330 by a certain tightening torque.

The hinge unit 230 is held by the guard portions of the screws 330 on the support portions 310, and a clearance S is formed between the bottom surface of the hinge unit 230 and the top surface of the fixing base 220. The operation unit 60 is held by the guard portions of the screws 330, and the load of the operation unit 60 does not act on the second torque hinge 250 inserted in the second hinge 230B of the hinge unit 230. Accordingly, even if external force is applied to rotate the operation unit 60 downward, the force is supported by the guard portions of the screws 330 to prevent deformation of the second torque hinge 250.

Figure 22:
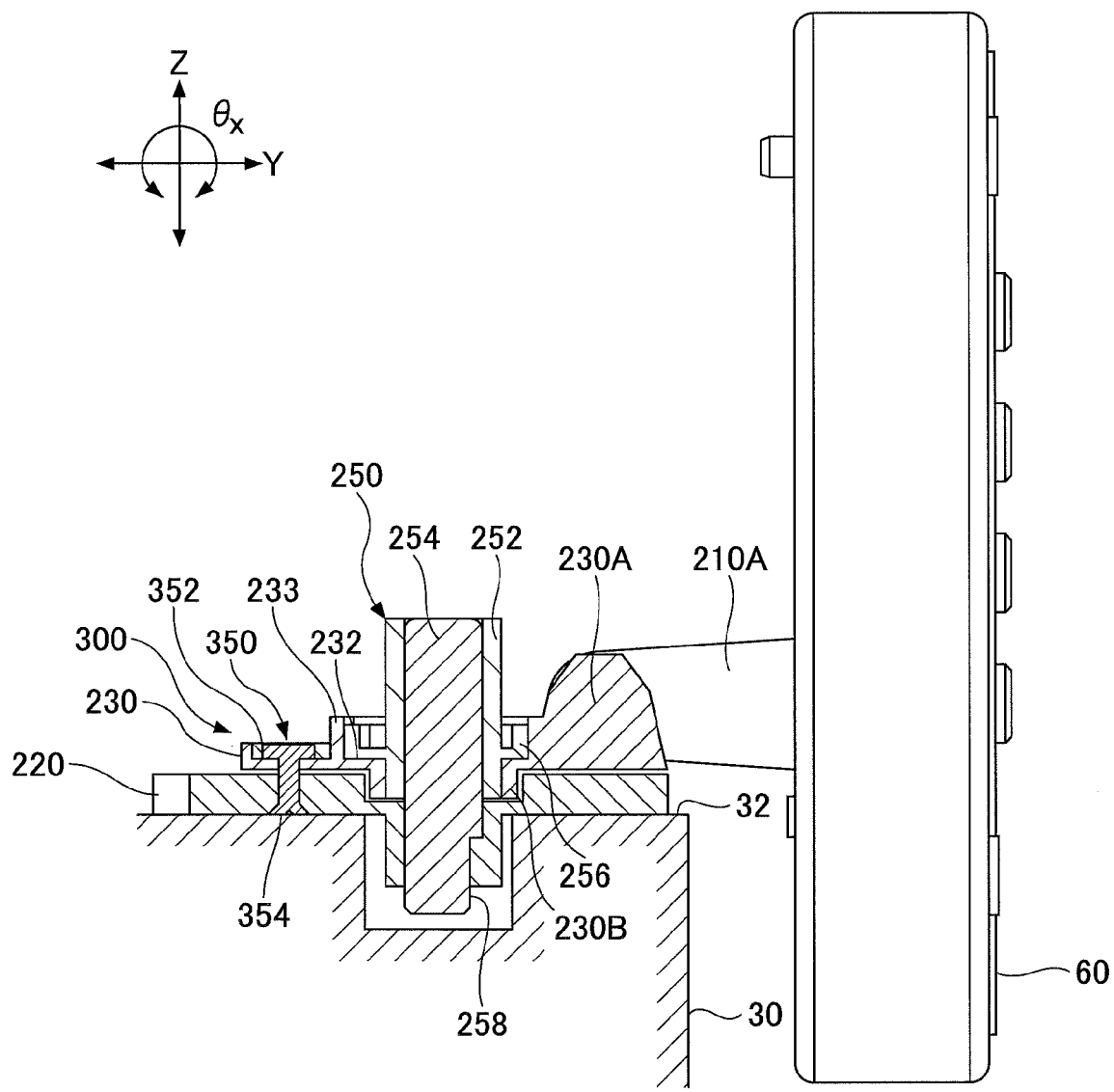
FIG. 22 is a vertical cross-sectional view of a modification of the fixing structure of the supporting device.

FIG. 22 is a vertical cross-sectional view of a modification of the fixing structure 300 of the supporting device 200. As shown in FIG. 22, in the modified fixing structure 300, a pair of calking pins (fastening parts) 350 are inserted in the arc-shaped through holes 236 and 237. The head 352 of each calking pin 350 has a major diameter which is larger than the width of each of the arc-shaped through holes 236 and 237, and the lower end 354 of each calking pin 350 is calked where the diameter of the calking pin 350 is enlarged in a tapered formation.

The hinge unit 230 is held by a fixed torque between the heads 352 and the lower ends 354 of the calking pins 350, and a clearance S is formed between the bottom surface of the hinge unit 230 and the top surface of the fixing base 220. The operation unit 60 is held by the calking pins 350, and the load of the operation unit 60 does not act on the second torque hinge 250 inserted in the second hinge 230B of the hinge unit 230. Accordingly, even if external force is applied to rotate the operation unit 60 downward, the force is supported by the calking pins 350 to prevent deformation of the second torque hinge 250.

Figure 23A:
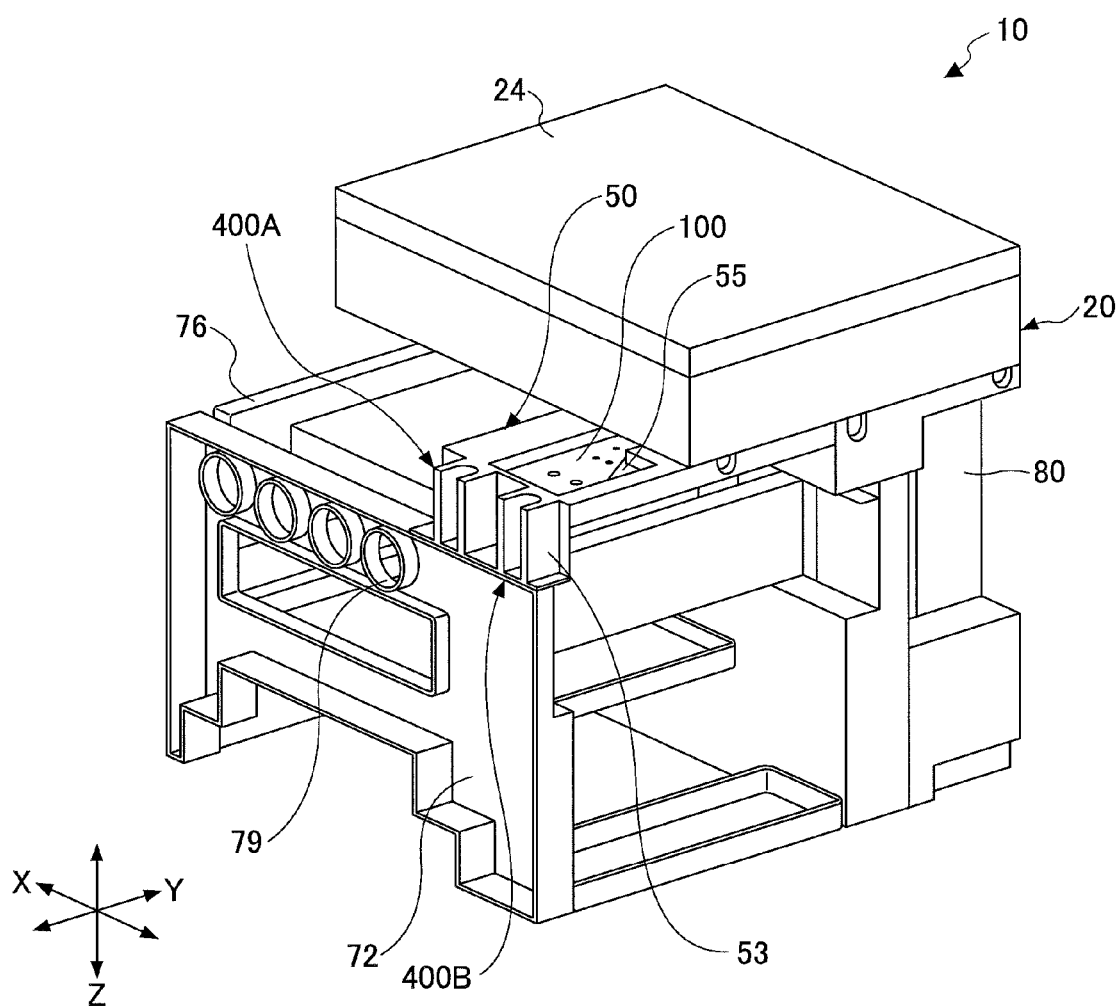
FIG. 23A is a perspective view of a supporting-unit reinforcement portion of the image forming device.
Figure 23B:
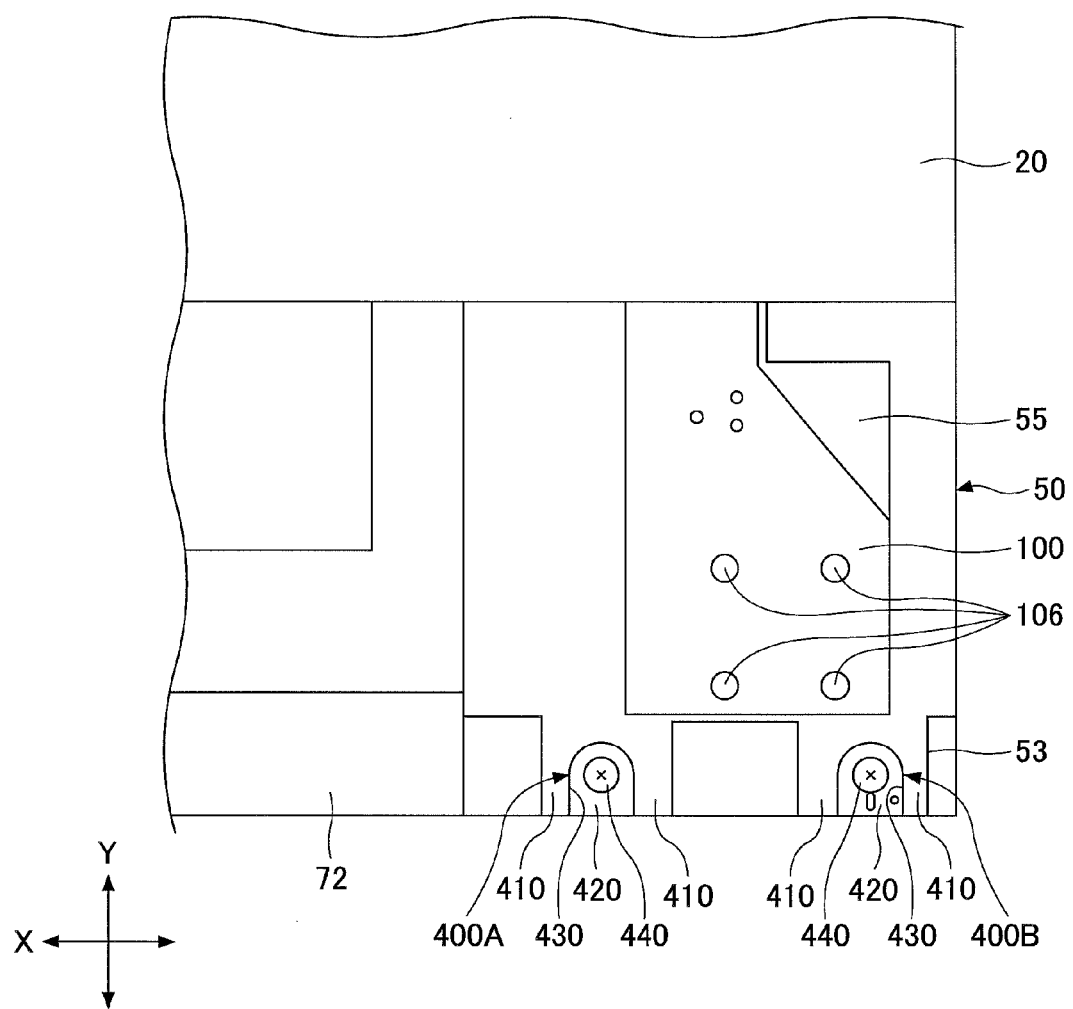
FIG. 23B is an enlarged plan view of the supporting-unit reinforcement portion.

FIG. 23A is a perspective view of the supporting-unit reinforcement portion of the image forming device. FIG. 23B is an enlarged plan view of the supporting-unit reinforcement portion. As shown in FIG. 23A and FIG. 23B, a pair of supporting-unit reinforcement portions 400A and 400B is formed in the second contact portion 53 of the supporting unit 50. Each of the supporting-unit reinforcement portions 400A and 400B is formed integrally with the second contact portion 53 of the supporting unit 50 and includes a plurality of projections which project forward from the end of the supporting unit 50 in the direction of Y and have a U-shaped or rectangular cross-section.

Each of the supporting-unit reinforcement portions 400A and 400B of this embodiment includes a pair of vertical walls 410 which project from the front-end wall of the second contact portion 53 (front side), and a horizontal connecting portion 420 which connects the bottom parts of the vertical walls 410 together. The vertical walls 410 are formed to extend in the vertical direction (in the direction of Z) and arranged in parallel with a predetermined interval between the vertical walls 410.

The horizontal connecting portion 420 extends in the horizontal direction (in the direction of X), contacts the upper part of the front vertical frame 72 of the frame body 70, and connects the lower ends of the vertical walls 410 together. Each supporting-unit reinforcement portion 400 is formed to have a U-shaped cross-section when viewed from the front of the image forming device, and a slot 430 which extends in the vertical direction is formed between the vertical projections 410. Alternatively, a supporting-unit reinforcement portion having a rectangular cross-section when viewed from the front of the image forming device may be formed by connecting the upper ends of the vertical walls 410 by an additional horizontal connecting portion 420.

Each of the supporting-unit reinforcement portions 400A and 400B includes the vertical walls 410 which extend downward from the front-end side wall (end face) of the supporting unit 50 and is formed to have an L-shaped cross-section when viewed from the front of the image forming device. The horizontal connecting portion 420 on the bottom is secured to the upper part of the front vertical frame 72 by a fastening screw 440, such as a threaded screw.

The supporting-unit reinforcement portions 400A and 400B support the supporting unit 50 in the horizontal condition, and even if compressive stress or tensile stress is applied to the supporting unit 50, distortion of the supporting unit 50 is prevented. Further, even if the stress due to the load changes or reaction force generated when the image reading unit 20 attached to the top surface of the supporting unit 50 performs a reading operation is exerted on the supporting unit 50, the rigidity of the supporting unit 50 is increased by the supporting-unit reinforcement portions 400A and 400B, and the image reading unit 20 can be supported in the horizontal state.

Accordingly, distortion of the supporting unit 50 by the load changes during the reading operation of the image reading unit 20 is prevented by the use of the supporting-unit reinforcement portions 400A and 400B. Consequently, the horizontal state of the image reading unit 20 can be stably maintained and the accuracy of image reading can be increased.

Figure 24:
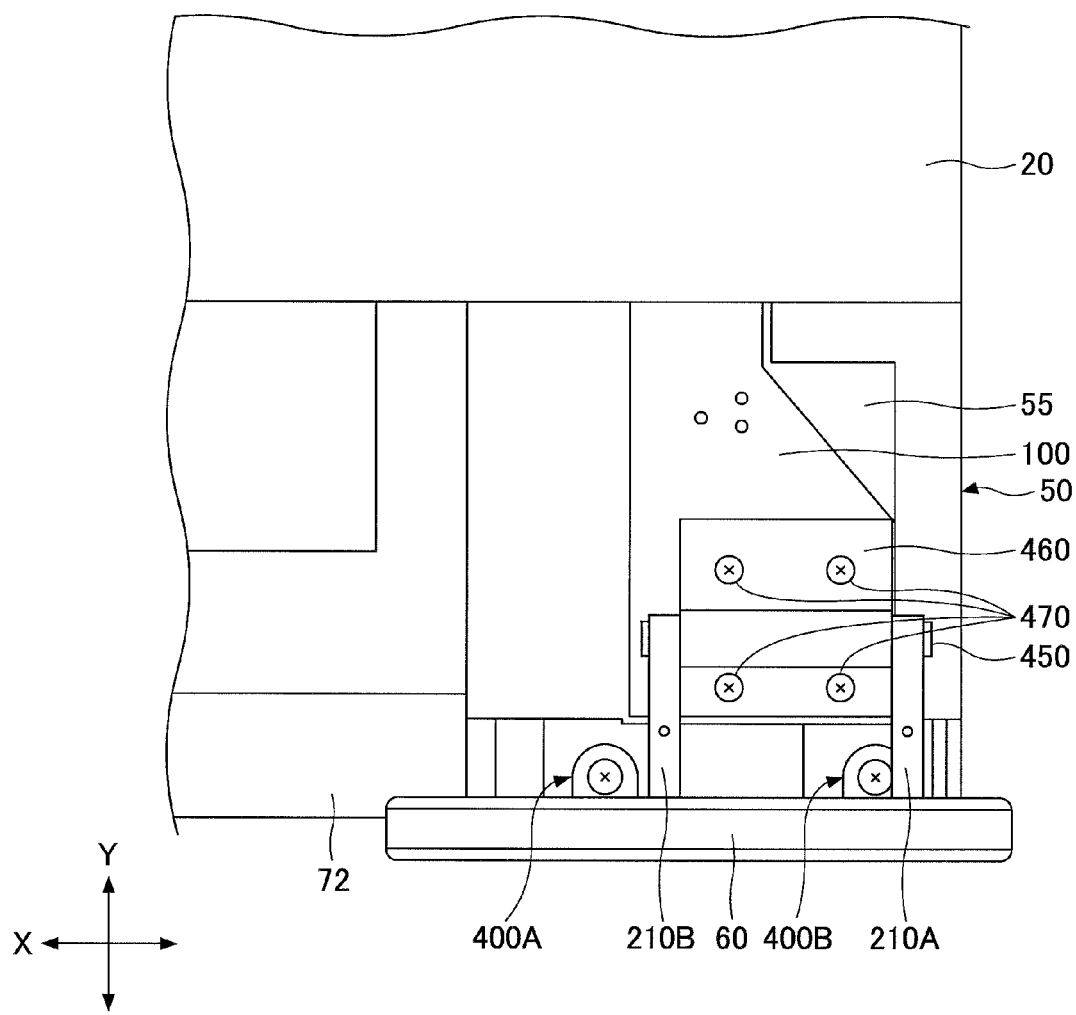
FIG. 24 is an enlarged plan view of a modification of the supporting device of the operation unit.

FIG. 24 is an enlarged plan view of a modification of the supporting device of the operation unit. As shown in FIG. 24, the operation unit 60 is supported to be rotatable in the vertical direction by a transversely extending shaft 450 which extends in the direction of X to penetrate the arm parts 210A and 210B on the back side of the operation unit 60.

The shaft 450 is held by a fixing member 460 which extends in the direction of Y which is perpendicular to the direction of X. The fixing member 460 has fastening holes at the front and rear locations on the front and rear sides of the shaft 450, where four fastening screws (fastening parts) 470 are fitted to the fastening holes. The locations of the above-described fastening holes are in conformity with the screw holes 55b formed in the recess 55 of the supporting unit 50 (refer to FIG. 7 and FIG. 8) and the four holes 106 provided in the reinforcing member 100 as shown in FIG. 23B.

With the use of the fixing member 460, the fastening parts at two locations on each of the front and rear sides of the shaft 450 in the direction of Y (the four fastening screws 470 in total) are fitted and secured to the screw holes 55b of the supporting unit 50. Even if external force is applied to lift the front side of the operation unit 60 (backward moment) when rotating the operation unit 60 upward, or to lift the rear side of the operation unit 60 (forward moment) when rotating the operation unit 60 downward, the shaft 450 can be held without rattle.

Figure 25A:
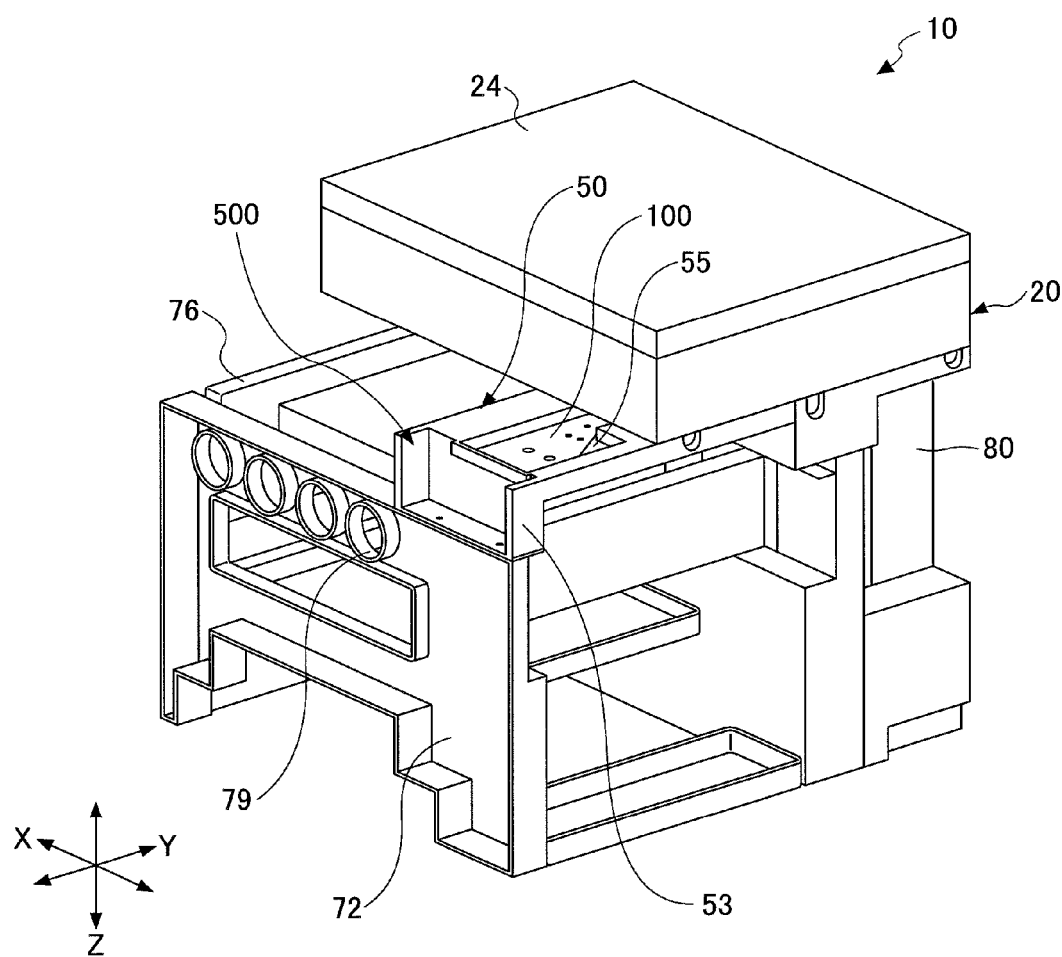
FIG. 25A is a perspective view of a modification of the supporting-unit reinforcement portion.
Figure 25B:
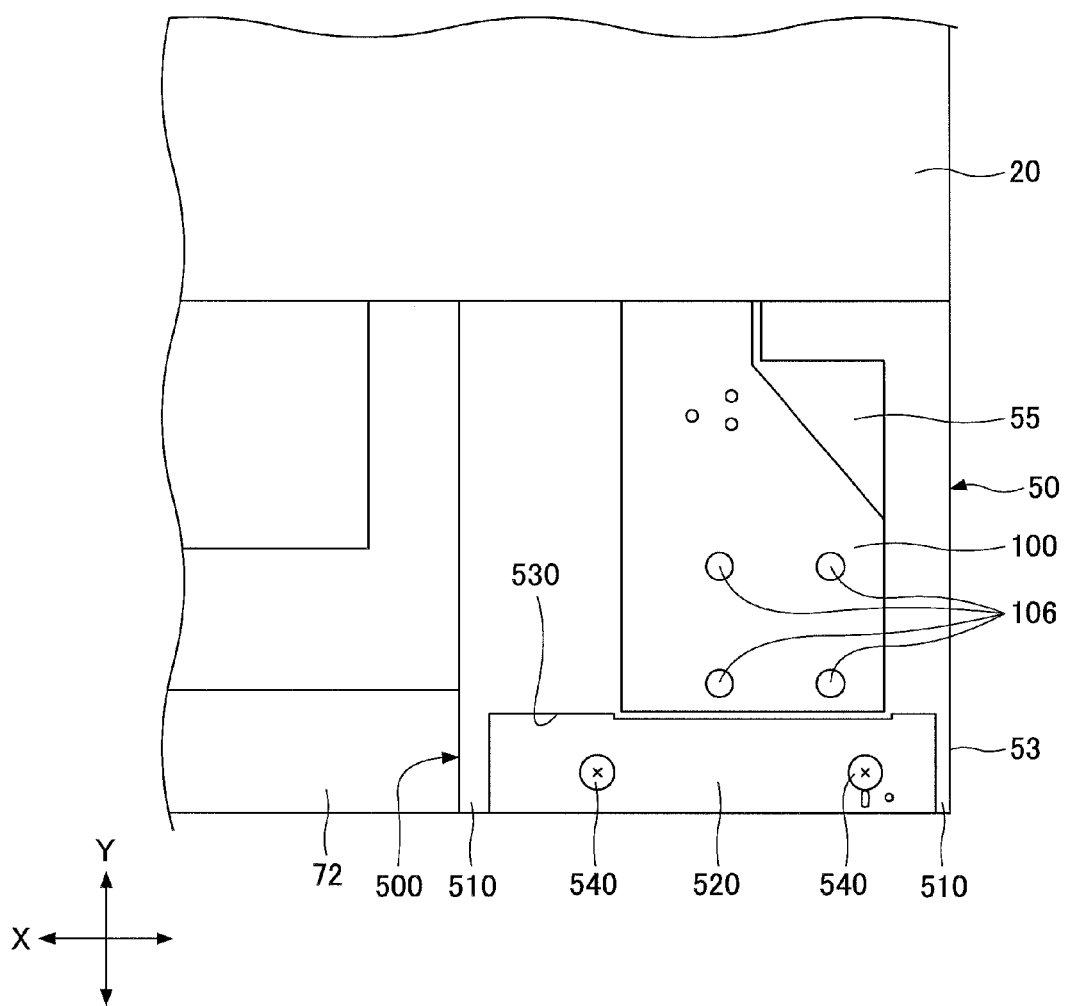
FIG. 25B is an enlarged plan view of the modification of the supporting-unit reinforcement portion.

FIG. 25A is a perspective view of a modification of the supporting-unit reinforcement portion. FIG. 25B is an enlarged plan view of the modification of the supporting-unit reinforcement portion. As shown in FIGS. 25A and 25B, the supporting-unit reinforcement portion 500 of this modification is formed integrally with the second contact portion 53 of the supporting unit 50 and includes a plurality of vertical projections which project toward the front side from the end of the supporting unit 50 and have a U-shaped or rectangular cross-section.

The supporting-unit reinforcement portion 500 includes a pair of vertical walls 510 which project outside from the front end of the second contact portion 53, and a horizontal connecting portion 520 which connects the lower ends of the vertical walls 510 together. The vertical walls 510 are formed with a predetermined interval between the vertical walls 510 and extend in the vertical direction.

The horizontal connecting portion 520 is formed to extend in the horizontal direction so that the horizontal connecting portion 520 contacts the upper part of the front vertical frame 72 of the frame body 70 and connects the lower ends of the vertical walls 510 together. The supporting-unit reinforcement portion 500 is formed to have a U-shaped cross-section when viewed from the front of the image forming device, and a recess portion 530 having a rectangular shape is formed between the vertical projections 510. Alternatively, a supporting-unit reinforcement portion having a rectangular cross-section when viewed from the front of the image forming device may be formed by connecting the upper ends of the vertical walls 510 by an additional horizontal connecting portion 520.

In the supporting-unit reinforcement portion 500, the vertical walls 510 extend downward from the front end face of the supporting unit 50. When viewed from a side position of the image forming device, the supporting-unit reinforcement portion 500 has an L-shaped configuration. Using the fastening parts (such as the fastening screws 540), the horizontal connecting portion 520 is secured to the upper part of the front vertical frame 72. The supporting-unit reinforcement portion 500 supports the supporting unit 50 in a horizontal condition. If compressive stress or tensile stress is exerted on the supporting unit 50, the supporting-unit reinforcement portion 500 prevents distortion of the supporting unit 50. If the compressive stress or tensile stress is exerted due to the influence of load changes and reaction force which the supporting unit 50 generates when the image reading unit 20 attached to the top surface performs a reading operation rigidity of the supporting unit 50 increases by the supporting-unit reinforcement portion 500, and the image reading unit 20 can be supported in a horizontal condition.

Therefore, distortion of the supporting unit 50 due to load changes during the reading operation of the image reading unit 20 is prevented by the supporting-unit reinforcement portion 500, and as a result the horizontal condition of the image reading unit 20 is maintained stably and the image reading accuracy is increased.

The image forming device of the foregoing embodiment is applicable to a copier, a facsimile, and a multi-functional peripheral having multiple functions of a copier, a facsimile, a printer, a scanner, etc.

According to the present disclosure, the image reading unit can be supported in a stable condition, the accuracy of image reading by the image reading unit can be increased, and the quality of the image transferred to the copy sheet can be increased.

According to the present disclosure, the operation unit can be adjusted to an arbitrary rotated position in any of the vertical and horizontal directions, and the operation unit can be held stably in the rotated position.

The present disclosure is not limited to the specifically disclosed embodiments, and variations and modifications may be made without departing from the scope of the present disclosure.

The present application is based upon and claims the benefit of priority of Japanese patent application No. 2010-287893, filed on Dec. 24, 2010, Japanese patent application No. 2011-030625, filed on Feb. 16, 2011, and Japanese patent application No. 2011-071099, filed on Mar. 28, 2011, the contents of which are incorporated herein by reference in their entirety.

What is claimed is:

1. An image forming device comprising:
   an image forming unit;
   an image reading unit arranged above an upper part of the image forming unit;
   a sheet ejection space between the image forming unit and the image reading unit; and
   a supporting unit arranged on the upper part of the image forming unit to surround at least two sides of the sheet ejection space in different directions,
   wherein the image reading unit is secured to the upper part of the image forming unit through the supporting unit, and
   wherein the supporting unit comprises;
   a vertical frame arranged to receive a load of the image forming unit in a vertical direction;
   a first support portion extending in a first direction parallel to one side of the sheet ejection space; and
   a second support portion extending in a second direction perpendicular to the first direction, and parallel to the other side of the sheet ejection space,
   wherein the first support portion and the second support portion are arranged on the vertical frame.

2. The image forming device according to claim 1, wherein the image reading unit is smaller in size than the upper part of the image forming unit and fixed to the supporting unit in a position shifted to a rear end of the image forming unit.

3. The image forming device according to claim 1, wherein the supporting unit is formed of a resin material.

4. The image forming device according to claim 1, wherein the supporting unit is an integrally molded part.

5. The image forming device according to claim 1, wherein the supporting unit comprises a reinforcing member which is formed of a metallic material.

6. The image forming device according to claim 1, wherein the supporting unit comprises an air passage to allow the sheet ejection space to communicate with the outside.

7. An image forming device according to claim 1, wherein the image forming unit includes an elastic member disposed on a lower part of the vertical frame.

8. An image forming device comprising:
   an image forming unit;
   an image reading unit arranged above an upper part of the image forming unit;
   a sheet ejection space between the image forming unit and the image reading unit; and
   a supporting unit arranged on the upper part of the image forming unit to surround at least two sides of the sheet ejection space in different directions;
   wherein the image reading unit is secured to the upper part of the image forming unit through the supporting unit; and
   wherein the image forming device further comprises:
   an operation unit to receive an input operation;
   a supporting device disposed on an upper part of the image forming unit to support the operation unit rotatably in any of vertical and horizontal directions; and
   a torque generating part to hold the operation unit in an arbitrary rotated position.

9. The image forming device according to claim 8, wherein the supporting device comprises:
   a first fixing portion fixed to the rear-end face of the operation unit;
   a second fixing portion fixed to an upper part of the image forming unit; and
   a hinge unit connected to the first fixing portion and the second fixing portion to be rotatable in any of the vertical and horizontal directions.

10. The image forming device according to claim 9, wherein the hinge unit comprises:
    a first hinge connected to the first fixing portion to be rotatable in the vertical direction; and
    a second hinge connected to the second fixing portion to be rotatable in the horizontal direction.

11. The image forming device according to claim 10, wherein the first hinge includes a first shaft in which the first fixing portion is penetrated in the horizontal direction and the first hinge supports the hinge unit rotatably in the horizontal direction by the first shaft.

12. The image forming device according to claim 10, wherein the second hinge includes a second shaft in which the second fixing portion is penetrated in the vertical direction and the second hinge supports the hinge unit rotatably in the horizontal direction by the second shaft.

13. The image forming device according to claim 10, wherein the hinge unit is arranged to provide an interval between a top surface of the second fixing portion and a bottom surface of the second hinge.

14. The image forming device according to claim 10, further comprises a fastening part to fasten the hinge unit to a top surface of the second fixing portion so that the hinge unit is held by the fastening part.

15. The image forming device according to claim 10, wherein each of the first hinge and the second hinge includes the torque generating part, and when the operation unit is moved to a rotated position, the hinge unit holds the operation unit in the rotated position.

16. An image forming device comprising:
    an image forming unit;
    an image reading unit arranged above an upper part of the image forming unit;
    a sheet ejection space between the image forming unit and the image reading unit;
    a supporting unit arranged on the upper part of the image forming unit to surround at least two sides of the sheet ejection space in different directions;
    wherein the image reading unit is secured to the upper part of the image forming unit through the supporting unit;
    wherein the image forming device further comprises:
    an operation unit to receive an input operation;
    a supporting device disposed on an upper part of the image forming unit to rotatably support the operation unit; and
    a supporting-unit reinforcement portion disposed at an end of the supporting unit to contact an upper part of a frame of the image forming unit in order to prevent distortion of the supporting unit by a load exerted on the supporting unit.

17. The image forming device according to claim 16, wherein the supporting-unit reinforcement portion is formed integrally with the supporting unit and comprises a plurality of vertical projections each having a U-shaped or rectangular cross-section.

18. The image forming device according to claim 16, wherein the supporting-unit reinforcement portion comprises:
    a pair of vertical walls projecting from an end face of the supporting unit; and
    a horizontal connecting portion connecting the pair of vertical walls together.

19. The image forming device according to claim 16, further comprising a fixing member secured to the top surface of the supporting unit by a plurality of fastening parts, wherein the operation unit is rotatably supported on the top surface of the supporting unit by a transversely extending shaft, the fixing member extends in a direction which is perpendicular to the shaft, and the plurality of fastening parts secure the fixing member to the supporting unit at front and rear locations on front and rear sides of the shaft respectively.

* * * * *